(12) United States Patent
Kang

(10) Patent No.: US 9,959,034 B2
(45) Date of Patent: May 1, 2018

(54) MOBILE TERMINAL AND METHOD FOR CONTROLLING THE SAME

(71) Applicant: LG Electronics Inc., Seoul (KR)

(72) Inventor: Hokyun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 14/735,023

(22) Filed: Jun. 9, 2015

(65) Prior Publication Data

US 2016/0085878 A1    Mar. 24, 2016

(30) Foreign Application Priority Data

Sep. 24, 2014  (KR) ........................ 10-2014-0127857

(51) Int. Cl.
*G06F 3/0488* (2013.01)
*G06F 3/0483* (2013.01)
(Continued)

(52) U.S. Cl.
CPC .......... *G06F 3/0488* (2013.01); *G06F 3/0481* (2013.01); *G06F 3/0483* (2013.01); *G06F 17/30873* (2013.01)

(58) Field of Classification Search
CPC .... G06F 3/0481; G06F 3/0483; G06F 3/0488; G06F 17/30873
(Continued)

(56) References Cited

U.S. PATENT DOCUMENTS 5,738,527 A * 4/1998 Lundberg ................. G09B 7/04
434/322
6,667,751 B1 * 12/2003 Wynn ............... G06F 17/30876
707/E17.112
(Continued)

FOREIGN PATENT DOCUMENTS

EP    2533146       12/2012
EP    2533146 A2 * 12/2012    ......... G06F 3/04883
(Continued)

OTHER PUBLICATIONS

European Patent Office Application Serial No. 151843695, Search Report dated Dec. 14, 2015, 8 pages.
(Continued)

*Primary Examiner* — Stephen Hong
*Assistant Examiner* — Aaron Bennion
(74) *Attorney, Agent, or Firm* — Lee, Hong, Degerman, Kang & Waimey

(57) ABSTRACT

A mobile terminal and a method for controlling the same are disclosed. The mobile terminal according to the present invention includes a touchscreen configured to display an execution screen of an application, and a controller configured to respectively display, on the execution screen, a mark corresponding to a page displayed on the execution screen and a mark corresponding to a page changed from the page and, upon reception of input for selecting one of the displayed marks, to display a page corresponding to a selected mark on the execution screen. According to the present invention, a mark corresponding to a page displayed on an application execution screen is displayed to allow a specific page to be easily accessed.

18 Claims, 25 Drawing Sheets

(51) Int. Cl.
*G06F 3/0481* (2013.01)
*G06F 17/30* (2006.01)

(58) Field of Classification Search
USPC .......................................... 715/201
See application file for complete search history.

(56) References Cited

U.S. PATENT DOCUMENTS

| | | | | |
|---|---|---|---|---|
| 6,820,111 B1* | 11/2004 | Rubin | ............... | G06F 17/30884 |
| | | | | 707/E17.114 |
| 9,389,757 B1* | 7/2016 | Chen | ..................... | G06F 3/0483 |
| 2003/0018665 A1 | 1/2003 | Dovin et al. | | |
| 2011/0310048 A1* | 12/2011 | B.R | ..................... | G06F 3/04817 |
| | | | | 345/173 |
| 2014/0282118 A1* | 9/2014 | Kumamoto | ........... | G06F 3/0481 |
| | | | | 715/760 |
| 2015/0121257 A1* | 4/2015 | Kollencheri Puthenveettil | ......... | |
| | | | | G06F 17/30902 |
| | | | | 715/760 |

FOREIGN PATENT DOCUMENTS

| | | | | |
|---|---|---|---|---|
| EP | 2631812 | | 8/2013 | |
| EP | 2631812 A1 * | 8/2013 | ........... | G06F 3/0488 |
| WO | 2014/073037 | | 5/2014 | |

OTHER PUBLICATIONS

European Patent Office Application No. 15184369.5, Search Report dated May 13, 2016, 23 pages.
Igor Chtivelband: "HistoryLane: Web Browser History Visualization Method" In: "HistoryLane: Web Brower History Visualization Method", Oct. 11, 2012, Blekinge Teknisha Hogskola/COM, Karlskrona, Sweden, XP055129516, 79 pages.

* cited by examiner (a)  (b)

MOBILE TERMINAL AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2014-0127857, filed on Sep. 24, 2014, the contents of which are all hereby incorporated by reference herein in its entirety.

BACKGROUND OF THE DISCLOSURE

1. Field of the Disclosure

The present invention relates to a mobile terminal capable of conveniently displaying an application execution screen in consideration of user convenience and a method for controlling the same.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

In the meantime, when a page displayed on an application execution screen is changed in stages in a terminal, a user needs to turn pages in order reverse to page display order when the user wants to view a specific page. This is inconvenient for the user.

SUMMARY OF THE DISCLOSURE

Accordingly, an object of the present invention is to address the above-noted and other problems.

Another object of the present invention is to provide a mobile terminal configured to display marks corresponding to pages displayed on an application execution screen such that a specific page can be easily accessed and a method for controlling the same.

To accomplish the objects of the present invention, according to an embodiment of the present invention, there is provided a mobile terminal, including: a touchscreen configured to display an execution screen of an application; and a controller configured to respectively display, on the execution screen, a mark corresponding to a page displayed on the execution screen and a mark corresponding to a page changed from the page and, upon reception of input for selecting one of the displayed marks, to display a page corresponding to a selected mark on the execution screen.

The controller may be configured to display an address bar for displaying addresses of the pages on the execution screen, to divide the area of the address bar into regions on the basis of the number of changed pages and to respectively display the marks corresponding to the pages in the divided regions of the address bar.

The controller may be configured to display an address bar for displaying addresses of the pages and an area extended in one direction from the address bar on the execution screen, to divide the extended area into regions on the basis of the number of changed pages and to respectively display the marks corresponding to the pages in the divided regions of the extended area.

The controller may be configured to display a pop-up window on the execution screen, to divide the pop-up window into regions on the basis of the number of changed pages and to respectively display the marks corresponding to the pages in the divided regions of the pop-up window.

The controller may be configured to display a progress bar corresponding to change states of the pages on the execution screen, to divide the progress bar into sections on the basis of the number of changed pages and to respectively display the marks corresponding to the pages as divided sections of the progress bar.

When the page displayed on the execution screen is changed, the controller may be configured to display a thumbnail corresponding to the page on the execution screen.

The page changed from the displayed page may be displayed on the execution screen upon selection of a link included in the previous page displayed on the execution screen.

The marks corresponding the pages may be displayed in different colors and/or different shapes.

The mark corresponding to the page may be displayed in a size depending on a time for which the page is displayed on the execution screen.

Upon reception of input for selecting one of the marks, the controller may be configured to display the currently displayed page in one area of the execution screen and to display the page corresponding to the selected mark in the other area of the execution screen.

Upon reception of input for selecting one of the marks, the controller may be configured to display thumbnails of the pages corresponding to the marks and, upon reception of input for selecting one of the thumbnails, to display a page corresponding to the selected thumbnail.

The thumbnail may be displayed in a size depending on a time for which the page is displayed on the execution screen.

The thumbnail may be displayed in a translucent manner.

The thumbnail displayed on the execution screen may be removed when predetermined input is applied to the execution screen, the thumbnail is displayed for longer than a predetermined time, or a predetermined number of thumbnails or more are displayed.

When a specific page is displayed on the execution screen for a longer than a predetermined time, the controller may be configured to display a mark for indicating that the specific page is a page of interest.

The controller may be configured to extract a keyword with respect to the page of interest, to search pages including the keyword and to display searched pages.

Upon reception of predetermined input applied to a region of the execution screen, the controller may be configured to display the mark corresponding to the page currently displayed on the execution screen, on the execution screen.

When the page displayed on the execution screen is changed, a thumbnail corresponding to the page and an indicator for setting a mark may be displayed on the execution screen and, when input applied to the indicator is received, the mark corresponding to the indicator may be displayed.

According to another embodiment of the present invention, there is provided a method for controlling a mobile terminal, including: displaying an execution screen of an application; displaying, on the execution screen, a mark corresponding to a page displayed on the execution screen; when the page is changed, displaying a mark corresponding to a page changed from the page on the execution screen; and when input for selecting one of the displayed marks is received, displaying a page corresponding to a selected mark on the execution screen.

Effectiveness of the mobile terminal and the method for controlling the same according to the present invention will now be described.

According to at least one of embodiments of the present invention, a specific page can be accessed easily and rapidly since marks corresponding to pages displayed on an application execution screen are displayed and, when a specific mark is selected, a page corresponding to the selected mark is displayed.

In addition, according to at least one embodiment of the present invention, it is possible to intuitively recognize information about page display order by displaying marks corresponding to pages displayed on an execution screen.

Furthermore, according to at least one embodiment of the present invention, it is possible to display information about page display order in an address bar for displaying addresses of pages by displaying marks corresponding to pages in the address bar.

Moreover, according to at least one embodiment of the present invention, it is possible to intuitively recognize pages and rapidly select a specific page by displaying thumbnails corresponding to the pages.

In addition, according to at least one embodiment of the present invention, it is possible to easily visually recognize link information of sequentially linked pages.

According to at least one embodiment of the present invention, it is possible to easily recognize interest in each page by displaying a mark corresponding to each page in a size depending on a time for which the corresponding page is displayed.

According to at least one embodiment of the present invention, it is possible to search and display pages related to a high-profile page so as to conveniently access the related pages.

In addition, according to at least one embodiment of the present invention, a mark corresponding to a specific page can be displayed upon reception of a predetermined input.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
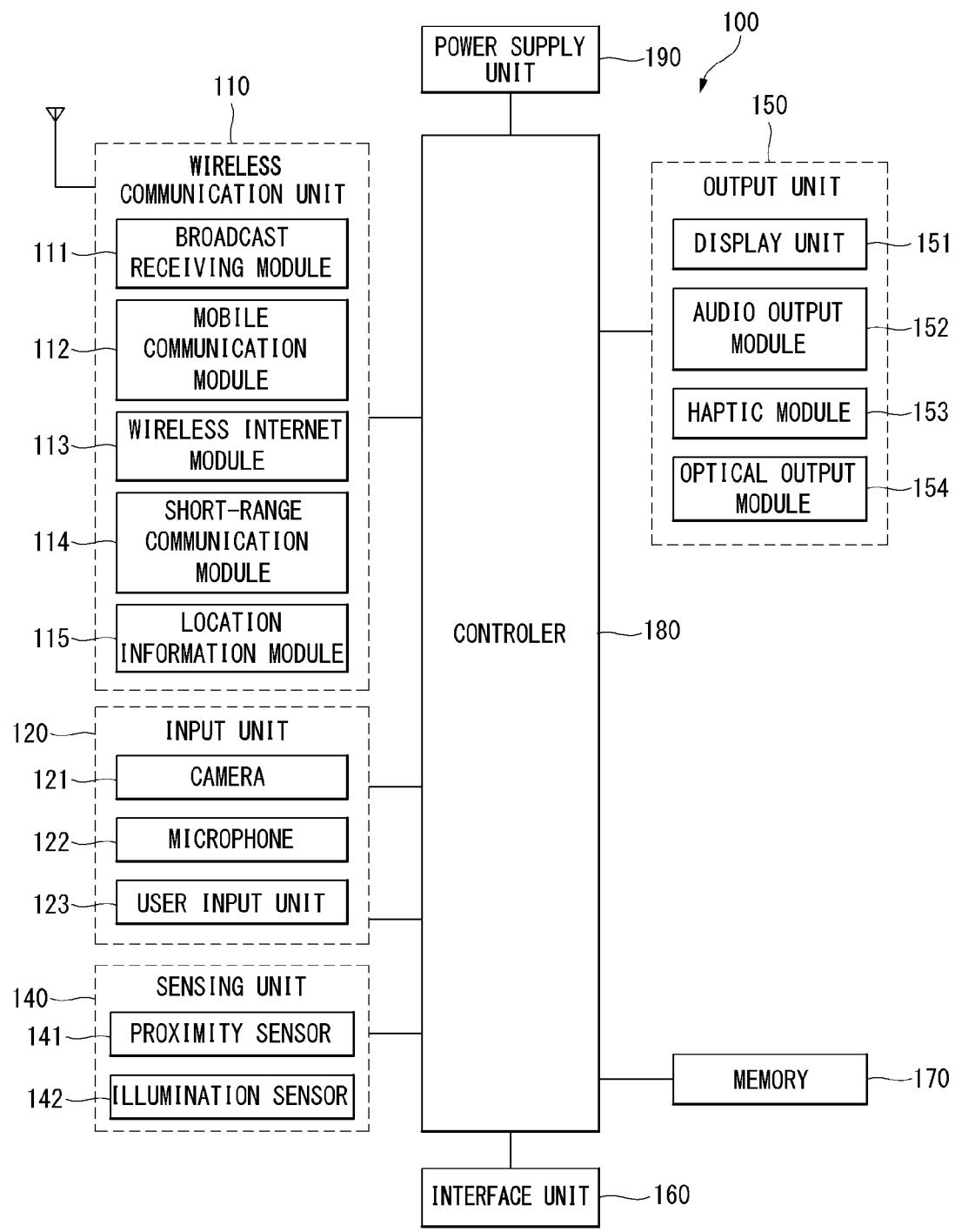
FIG. 1 is a block diagram of a mobile terminal in accordance with the present disclosure.

Reference is now made to FIG. 1, where FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Further preferred embodiments will be described in more detail with reference to additional drawing figures. It is understood by those skilled in the art that the present features can be embodied in several forms without departing from the characteristics thereof.

Figure 2:
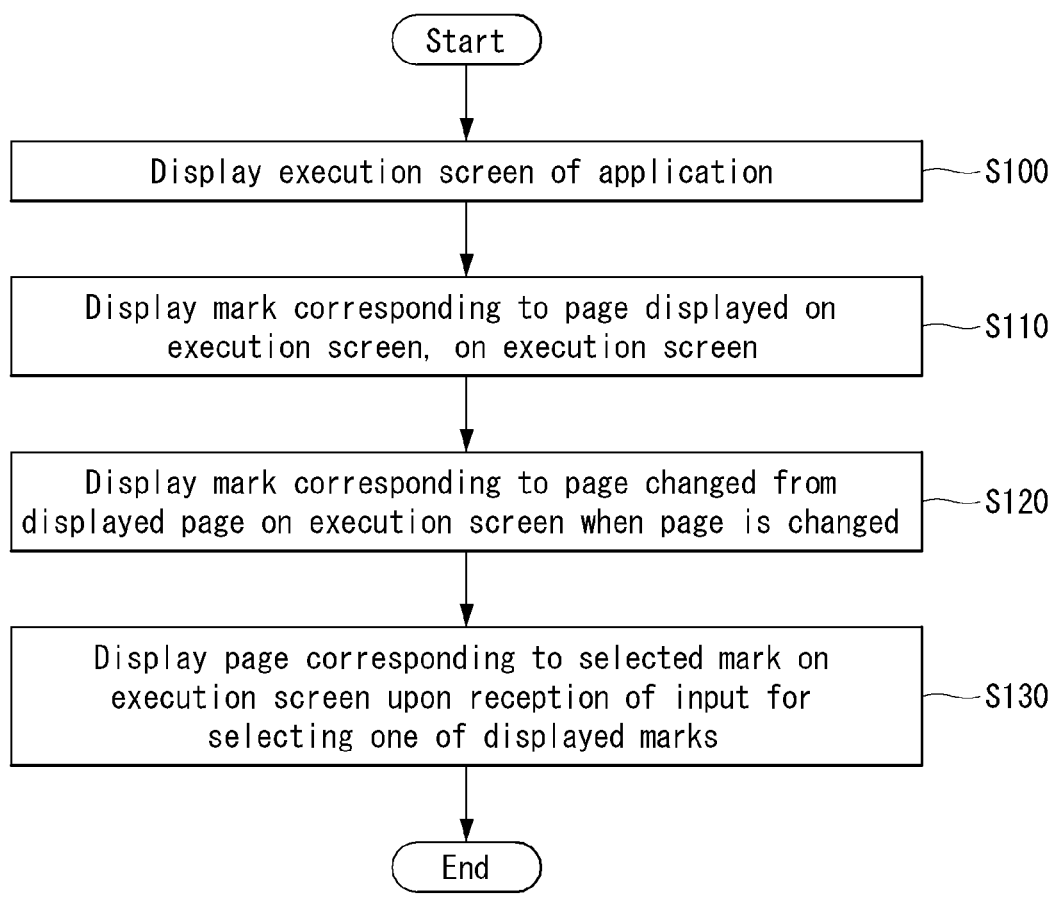
FIG. 2 is a flowchart illustrating a method for controlling a mobile terminal according to an embodiment of the present disclosure.
Figure 3:
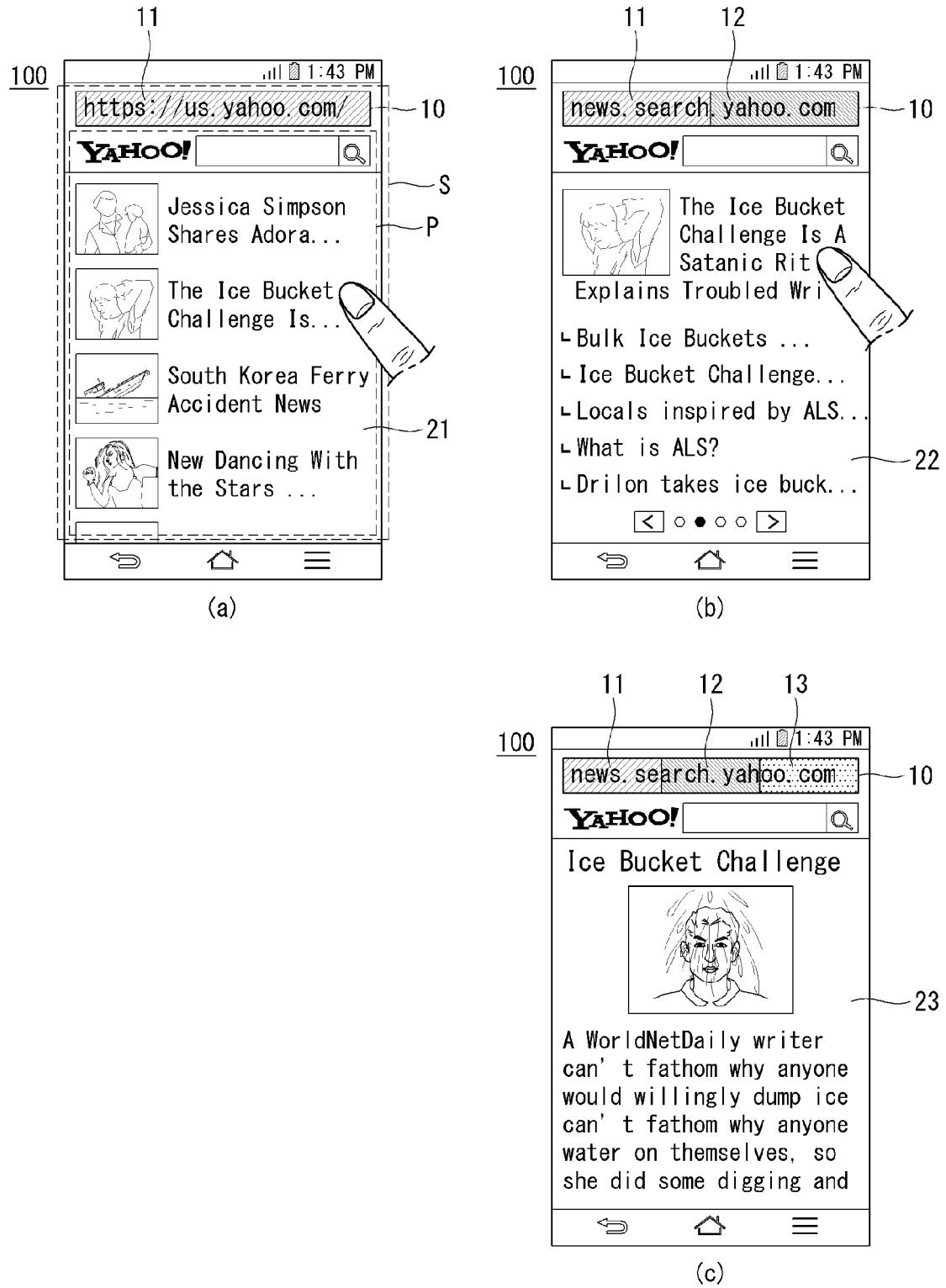
FIGS. 3, 4 and 5 illustrate operation of displaying marks corresponding to pages and displaying a specific page by selecting a mark according to an embodiment of the present disclosure.
Figure 4:
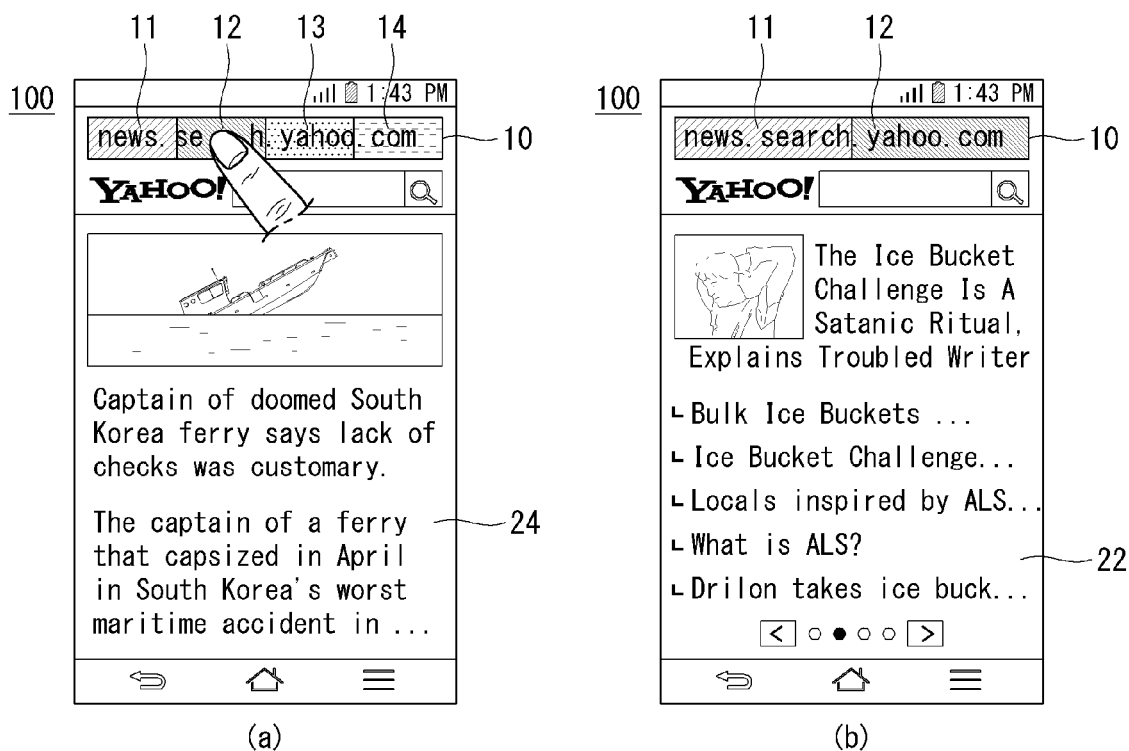
Figure 5:
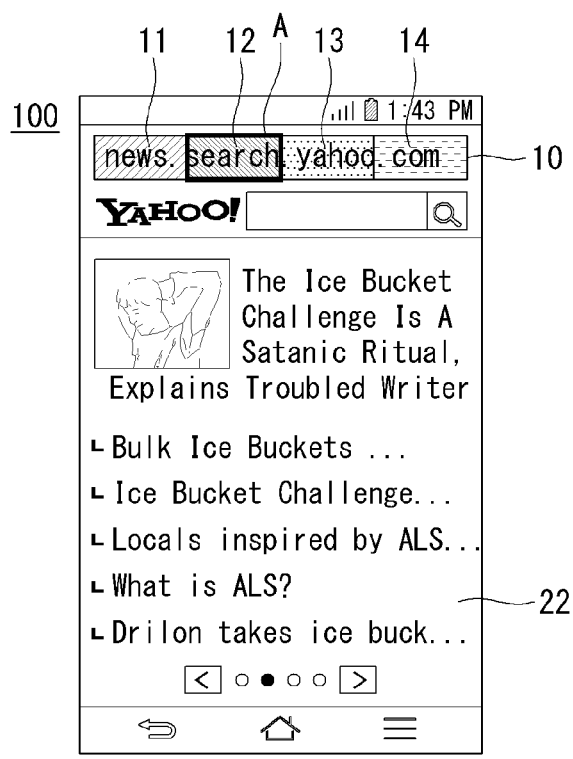

FIG. 2 is a flowchart illustrating a method for controlling a mobile terminal according to an embodiment of the present disclosure and FIGS. 3 to 5 illustrate operation of displaying a mark corresponding to a page and displaying a specific page by selecting a mark corresponding thereto according to an embodiment of the present disclosure.

The method for controlling a mobile terminal according to an embodiment of the present disclosure can be implemented in the mobile terminal 100 described with reference to FIG. 1. A description will be given of the method for controlling a mobile terminal and operations of the mobile terminal 100 to implement the same according to an embodiment of the present disclosure with reference to the attached drawings.

Referring to FIG. 2, the controller 180 may display an execution screen S of an application on the touchscreen 151 (S100).

Referring to FIG. 3(a), the application may be a web browser of displaying the execution screen S according to one embodiment. However, the present invention is not limited thereto and any application in which a page displayed on an execution screen has a depth value can be used.

A page display area P is included in the execution screen S and may have the same size as the execution screen S as necessary. Description of the page display area P and the execution screen S can be equally applied to embodiments described in the specification.

The depth value may be information about link order of pages displayed on the application execution screen. For example, a page which is displayed upon selection of a link included in a specific page can be considered to have a depth value larger than the depth value of the specific page by 1. According to another embodiment, the depth value may be an order of displaying pages on the execution screen irrespective of linkage of pages.

Referring back to FIG. 2, the controller 180 may display a mark corresponding to a page displayed on the execution screen (S110).

Referring to FIG. 3(a), the controller 180 may display an address bar 10 for displaying the address of the page on the application execution screen S. According to one embodiment, the controller 180 can display a mark 11 corresponding to the currently displayed page 21 in the address bar 10.

As shown in FIG. 3(a), the mark 11 may be displayed in a specific color in the address bar 10. However, the present invention is not limited thereto. The mark 11 can be displayed in a format that can be discriminated from other marks such as text in addition to a specific color or specific shape.

Referring back to FIG. 2, when the page is changed, the controller 180 may display a mark corresponding to a changed page on the execution screen (S120).

As shown in FIG. 3(a), the controller 180 may receive input for selecting a specific link included on the page 21. The controller 180 may display a page 22 corresponding to the selected specific link on the execution screen S, as shown in FIG. 3(b). When the previous page 21 has a depth value of 1, the currently displayed page 22 has a depth value of 2.

Referring to FIG. 3(b), the controller 180 may display a mark 12 corresponding to the changed page 22 in the address bar 10. The mark 12 can be displayed in a specific color or specific shape such that the mark 12 can be discriminated from the mark 11.

The controller 180 may divide the address bar 10 on the basis of the number of changed pages and respectively display the marks 11 and 12 corresponding to the pages 21 and 22 in the divided regions of the address bar 10. Since the number of changed pages 21 and 22 is 2 in FIGS. 3(a) and (b), the controller 180 can display the marks 11 and 12 in two divided regions of the address bar 10.

Referring to FIG. 3(b), the controller 180 may receive input for selecting a specific link included in the page 22. The controller 180 may display a page 23 corresponding to the selected specific link on the execution screen S, as shown in FIG. 3(c). When the depth value of the previous page 22 is 2, the depth value of the currently displayed page 23 is 3.

As shown in FIG. 3(c), the controller 180 may display a mark 13 corresponding to the changed page 23 in the address bar 10. The mark 13 may be displayed in a specific color or specific shape such that the mark 13 can be discriminated from the marks 11 and 12.

The controller 180 may divide the address bar 10 on the basis of the number of changed pages and respectively display the marks 11, 12 and 13 corresponding to the pages 21, 22 and 23 in the divided regions of the address bar 10. Since the number of changed pages 21, 22 and 23 is 3 in FIGS. 3(a), (b) and (c), the controller 180 can display the marks 11, 12 and 13 in three divided regions of the address bar 10.

FIG. 3 shows that the marks 11, 12 and 13 are displayed in the address bar 10 from left to right according to depth values thereof. However, the present invention is not limited thereto and display order may be changed as necessary. In one embodiment, the marks 11, 12 and 13 can be displayed in the address bar 10 from right to left.

Referring back to FIG. 2, when the controller 180 receives input for selecting one of the displayed marks, the controller 180 may display a page corresponding to the selected mark on the execution screen (S130).

Referring to FIG. 4(a), a page 24 and a mark 14 corresponding thereto are displayed. The mark 14 may be displayed according to the same process as described with reference to FIG. 3.

The controller 180 may receive input for selecting the specific mark 12 displayed in the address bar 10. For example, the input may be long touch applied for a predetermined time or longer.

However, the present invention is not limited thereto and the input may be touches in various manners, such as short touch, long touch, multi-touch, drag touch, flick touch, pinch-in touch, pinch-out touch, swipe touch and hovering touch, or a combination thereof. In this case, the input needs to be configured to be discriminated from touch input for selecting the address bar.

Referring to FIG. 4(b), the controller 180 may re-display the page 22 corresponding to the selected mark 12. The controller 180 may display the marks 11 and 12 including the selected mark 12 in the address bar 10, as shown in FIG. 4(b) according to one embodiment. In this case, the marks 13 and 14 corresponding to pages having larger depth values than the depth value of the currently displayed page 22 can be eliminated.

According to another embodiment, the controller 180 may display all the marks 11 to 14, as shown in FIG. 5. In this case, the controller 180 may further display an emphasis mark A for discriminating the mark 12 corresponding to the currently displayed page 22 from other marks. Emphasis of the border of the mark 12, shown in FIG. 5, is an example of the emphasis mark A and the emphasis mark may be displayed in other forms.

Accordingly, a user can visually recognize a depth value of a page displayed in a specific application. In addition, the user can directly move to a desired page by selecting a displayed mark and thus the user can conveniently use the application.

FIGS. 6 to 12 illustrate operation of displaying a mark corresponding to a page according to an embodiment of the present disclosure.

Figure 6:
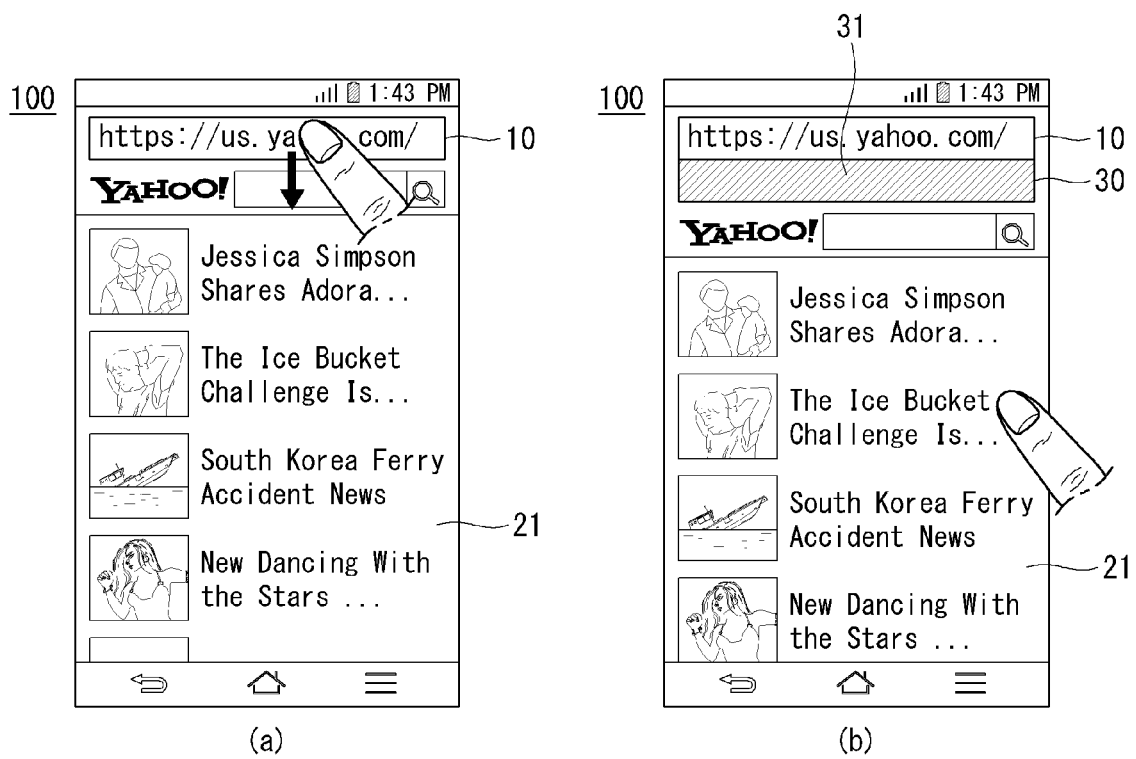
FIGS. 6 to 12 illustrate operation of displaying marks respectively corresponding to pages according to an embodiment of the present disclosure.
Figure 7:
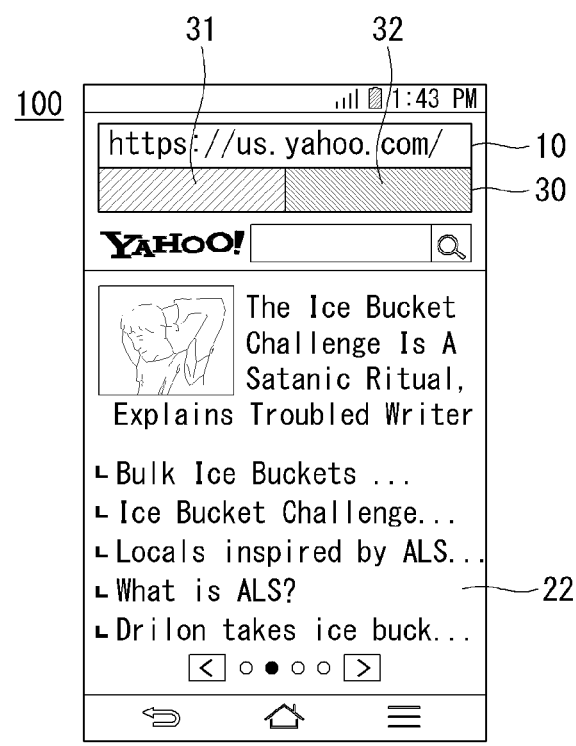

FIGS. 6 and 7 illustrate display of the mark corresponding to the page in an extended area 30 of the address bar according to an embodiment. As shown in FIG. 6(a), the controller 180 may receive a specific input with respect to the address bar 10. The specific input may be downward drag input applied to the address bar 10.

However, the present invention is not limited thereto and the specific input may be touches in various manners, such as short touch, long touch, multi-touch, drag touch, flick touch, pinch-in touch, pinch-out touch, swipe touch and hovering touch, or a combination thereof. In this case, the specific input needs to be configured to be discriminated from other inputs including touch input for selecting the address bar.

Upon reception of downward drag input applied to the address bar 10, the controller 180 may display the extended area 30 of the address bar under the address bar 10, as shown in FIG. 6(b). The controller 180 may display a mark 31 corresponding to the currently displayed page 21 in the extended area 30.

However, the present invention is not limited thereto. The extended area 30 of the address bar may be displayed on the address bar 10. In this case, the specific input is preferably set to upward drag input applied to the address bar 10, but the present invention is not limited thereto.

According to another embodiment, the controller 180 may be configured to initially simultaneously display the address bar 10 and the extended area 30 of the address bar.

Referring to FIG. 6(b), the controller 180 may receive input for selecting a specific link indicated in the page 21. The controller 180 may display the page 22 corresponding to the selected specific link on the execution screen S, as shown in FIG. 7. When the depth value of the previous page 21 is 1, the depth value of the currently displayed page 22 is 2.

As shown in FIG. 7, the controller 180 may display a mark 32 corresponding to the changed page 22 in the extended area 30 of the address bar. The mark 32 may be displayed in a specific color or specific shape such that the mark 32 can be discriminated from the mark 31.

The controller 180 may divide the extended area 30 of the address bar on the basis of the number of changed pages and respectively display the marks 31 and 32 corresponding to the pages 21 and 22 in the divided regions of the extended area 30. Description of the marks with reference to FIG. 3 can be equally applied to display of the marks 31 and 32 and thus detailed description thereof is omitted.

Further, the controller 180 may receive input for selecting one of marks displayed in the extended area 30 of the address bar. In this case, the controller 180 can display a page corresponding to the selected mark on the execution screen S, as described above with reference to FIG. 4.

Accordingly, the user can visually recognize a depth value of a page displayed in a specific application. In addition, the user can directly move to a desired page by selecting a displayed mark and thus the user can conveniently use the application.

Figure 8:
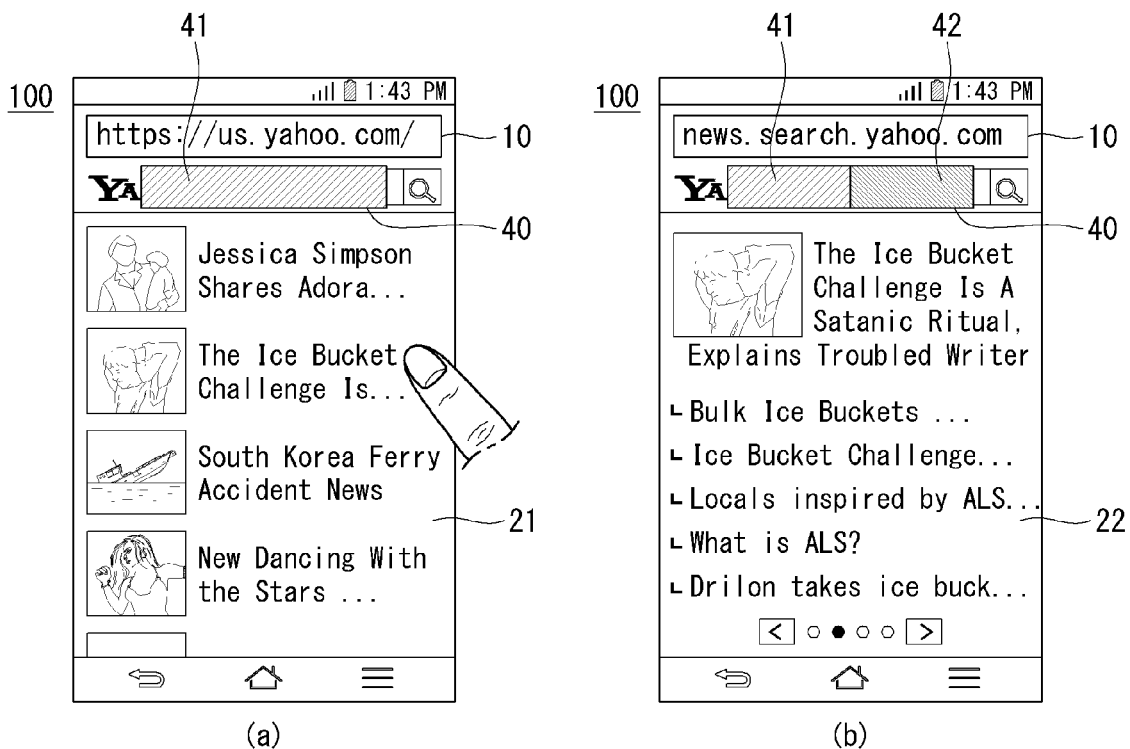

FIG. 8 illustrates operation of displaying a mark corresponding to a page in a pop-up window 40 according to an embodiment. As shown in FIG. 8(a), the controller 180 may display the pop-up window 40 on the execution screen S. The controller 180 may display a mark 41 corresponding to the displayed page 21 in the pop-up window 40.

In another embodiment, the controller 180 may be configured to display the pop-up window 40 upon reception of a specific input applied to a region of the execution screen S. The specific input may be touches in various manners, such as short touch, long touch, multi-touch, drag touch, flick touch, pinch-in touch, pinch-out touch, swipe touch and hovering touch, or a combination thereof.

The controller 180 may receive input for selecting a specific link indicated on the page 21, as shown in FIG. 8(a). The controller 180 may display the page 22 corresponding to the selected specific link on the execution screen S, as shown in FIG. 8(b). When the depth value of the previous page 21 is 1, the depth value of the currently displayed page 22 corresponds to 2.

As shown in FIG. 8(b), the controller 180 may display a mark 42 corresponding to the changed page 22 in the pop-up window 40. The mark 42 may be displayed in a specific color or specific shape such that the mark 42 can be discriminated from the mark 41.

The controller 180 may divide the area of the pop-up window 40 on the basis of the number of changed pages and respectively display the marks 41 and 42 corresponding to the pages 21 and 22 in the divided regions of the pop-up window 40. Description of the marks with reference to FIG. 3 can be equally applied to display of the marks 41 and 42 and thus detailed description thereof is omitted.

Further, the controller 180 may receive input for selecting one of marks displayed in the pop-up window 40. In this case, the controller 180 can display a page corresponding to the selected mark on the execution screen S, as described above with reference to FIG. 4.

Accordingly, the user can visually recognize a depth value of a page displayed in a specific application. In addition, the user can directly move to a desired page by selecting a displayed mark and thus the user can conveniently use the application.

Figure 9:
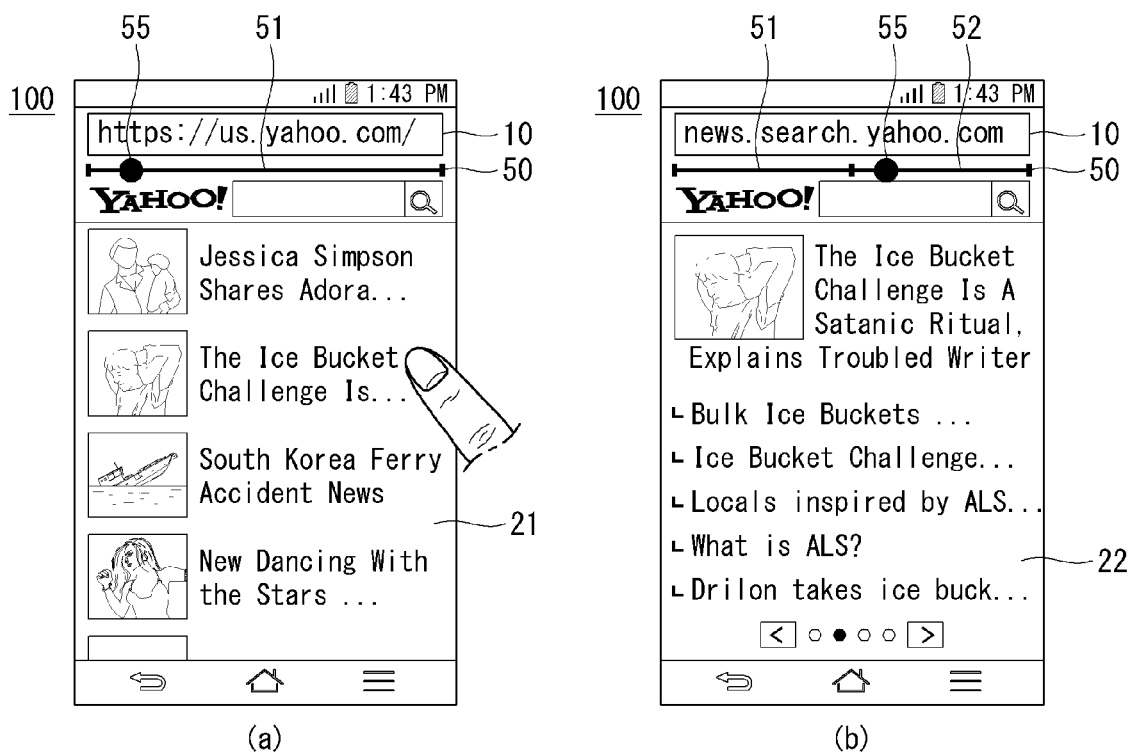

FIG. 9 illustrates operation of displaying a mark corresponding to a page on a progress bar 50 according to an embodiment. As shown in FIG. 9(a), the controller 180 may display the progress bar 50 corresponding to a change state of the page on the execution screen S. The controller 180 may display a mark 51 corresponding to the displayed page 21 as a section of the progress bar 50.

In one embodiment, sections of the progress bar 50 may be displayed in specific colors or specific shapes such that the sections can be discriminated.

A head 55 included in the progress bar 50 may be moved according to drag input. Since the progress bar 50 has one section in FIG. 9(*a*), the page 21 is not changed even when the head 55 is moved.

According to another embodiment, the controller 180 may be configured to display the progress bar 50 upon reception of a specific input applied to a region of the execution screen S. The specific input may be touches in various manners, such as short touch, long touch, multi-touch, drag touch, flick touch, pinch-in touch, pinch-out touch, swipe touch and hovering touch, or a combination thereof.

The controller 180 may receive input for selecting a specific link indicated on the page 21, as shown in FIG. 9(*a*). The controller 180 may display the page 22 corresponding to the selected specific link on the execution screen S, as shown in FIG. 9(*b*). When the depth value of the previous page 21 is 1, the depth value of the currently displayed page 22 corresponds to 2.

As shown in FIG. 9(*b*), the controller 180 may display a mark 52 corresponding to the changed page 22 as a section of the progress bar 50. Sections of the progress bar 50 may be displayed in specific colors or specific shapes such that the sections can be discriminated.

The controller 180 may divide the progress bar 50 into sections on the basis of the number of changed pages and respectively display the marks 51 and 52 corresponding to the pages 21 and 22 as the sections. Description of the marks with reference to FIG. 3 can be equally applied to display of the marks 51 and 52 and thus detailed description thereof is omitted.

Further, the controller 180 may receive input for moving the head 55 of the progress bar 50 to one of the sections 51 and 52. In this case, the controller 180 can display a page corresponding to a section to which the head 55 has been moved on the execution screen S, as described above with reference to FIG. 4.

Accordingly, the user can visually recognize a depth value of a page displayed in a specific application. In addition, the user can directly move to a desired page by simply manipulating the progress bar and thus the user can conveniently use the application.

Figure 10:
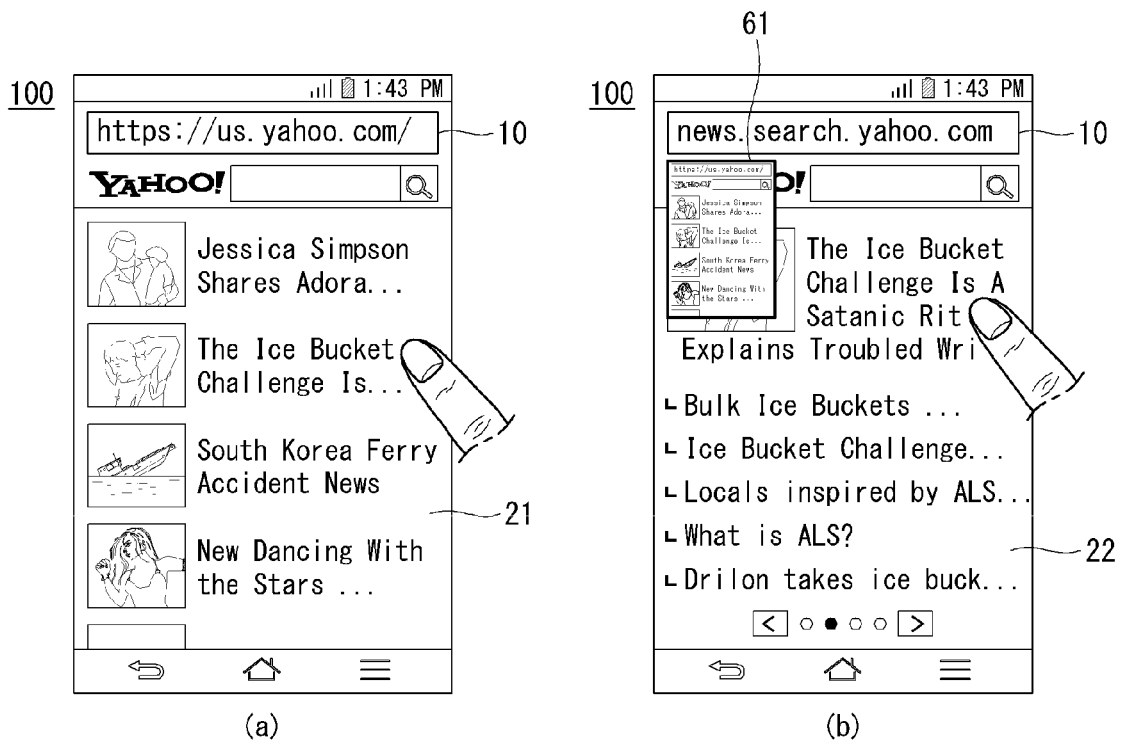

FIG. 10 illustrates operation of displaying a thumbnail corresponding to a page according to an embodiment. As shown in FIG. 10(*a*), the controller 180 may receive input for selecting a specific link indicated on the page 21.

The controller 180 may display the page 22 corresponding to the selected specific link on the execution screen S, as shown in FIG. 10(*b*). When the depth value of the previous page 21 is 1, the depth value of the currently displayed page 22 is 2. The controller 180 may display a thumbnail 61 corresponding to the previous page 21 on the execution screen S.

Referring to FIG. 10(*b*), the controller 180 may receive input for selecting a specific link indicated on the page 22.

The controller 180 may display the page 23 corresponding to the selected specific link on the execution screen S, as shown in FIG. 10(*c*). When the depth value of the previous page 21 is 2, the depth value of the currently displayed page 22 is 3. The controller 180 may display a thumbnail 62 corresponding to the previous page 22 on the execution screen S.

However, the present invention is not limited thereto. The controller 180 may be configured to display the thumbnail 61 corresponding to the currently displayed page 21 in FIG. 10(*a*). In this case, the controller 180 may display the two thumbnails 61 and 62 in FIG. 10(*b*). Further, the controller 180 may further display a new thumbnail corresponding to the currently displayed page 23 together with the two thumbnails 61 and 62 in FIG. 10(*c*).

Although FIG. 10 shows that the thumbnails 61 and 62 are displayed under the address bar 10, the present invention is not limited thereto. The thumbnails 61 and 62 may be displayed in an arbitrary area of the execution screen S. In one embodiment, the thumbnails 61 and 62 can be displayed in order of displaying the pages 21 and 22 corresponding thereto.

In another embodiment, the controller 180 may be configured to display the thumbnails 61 and 62 upon reception of a specific input applied to a region of the execution screen S. The specific input may be touches in various manners, such as short touch, long touch, multi-touch, drag touch, flick touch, pinch-in touch, pinch-out touch, swipe touch and hovering touch, or a combination thereof.

Further, the controller 180 may receive input for selecting one of the thumbnails 61 and 62. In this case the controller 180 may display a page corresponding to the selected thumbnail on the execution screen S as described with reference to FIG. 4.

Accordingly, the user can easily recognize a previous page through a thumbnail. In addition, the user can directly move to a desired page by selecting a displayed thumbnail and thus the user can conveniently use applications.

Figure 11:
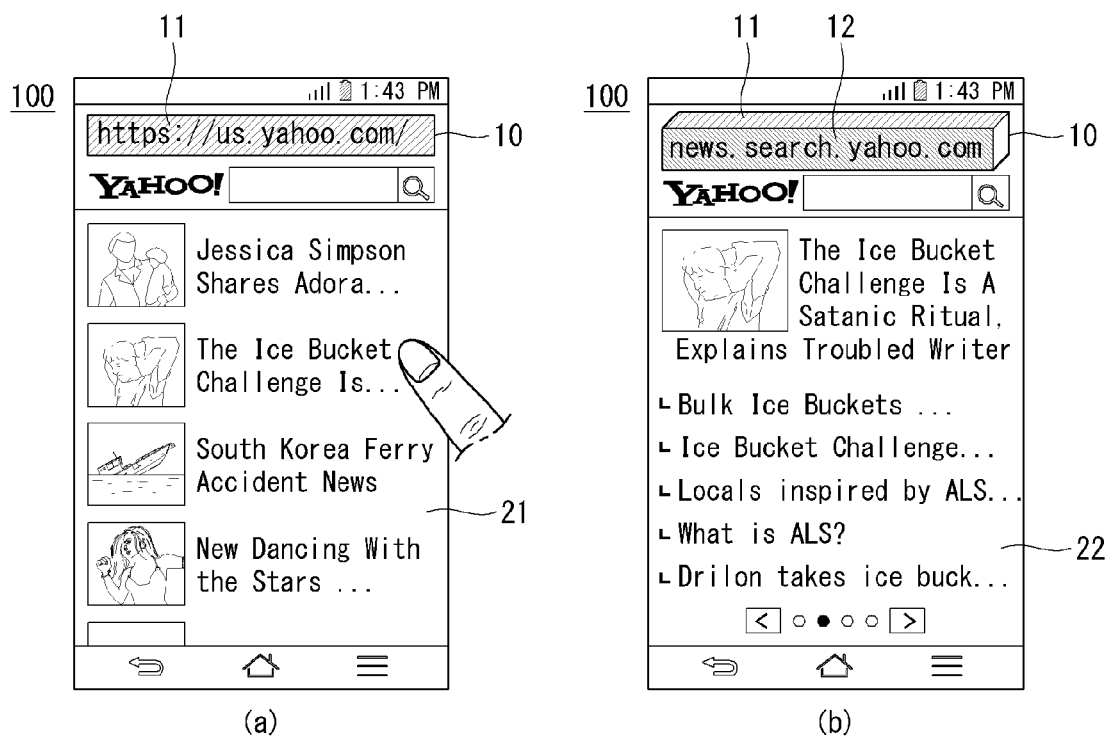
Figure 12:
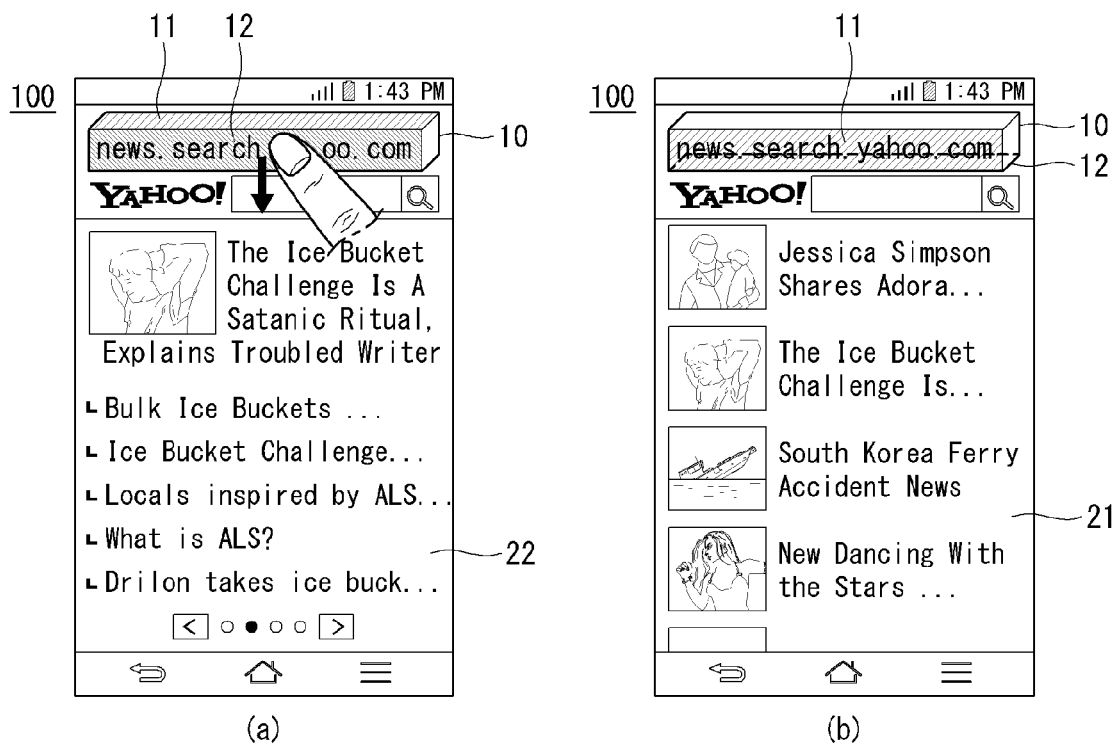

FIGS. 11 and 12 illustrate operation of displaying a mark corresponding to a page in the address bar 10 displayed in a polyhedral form according to an embodiment. The controller 180 may receive input for selecting a specific link indicated on the page 21, as shown in FIG. 11(*a*). The controller 180 may display the page 22 corresponding to the selected specific link on the execution screen S, as shown in FIG. 11(*b*). When the depth value of the previous page 21 is 1, the depth value of the currently displayed page 22 is 2.

Referring to FIG. 11(*b*), the controller 180 may display the address bar 10 in a rectangular parallelepiped form (square pillar). In this case, the controller 180 can display the mark 11 corresponding to the previous page 21 on the top surface of the square pillar. The controller 180 may display the mark 12 corresponding to the currently displayed page 22 on the front side of the address bar 10 displayed in the rectangular parallelepiped form.

When the page is changed, the controller 180 may rotate the rectangular parallelepiped upward. The controller 180 may display a mark corresponding to a newly displayed page on the front side of the address bar 10 displayed in the rectangular parallelepiped form.

While FIG. 11 shows the address bar 10 displayed in a rectangular parallelepiped form, the present invention is not limited thereto. The address bar 10 may be displayed in a polyhedral form having a different number of sides, such as a triangular pillar and a pentagonal pillar. According to one embodiment, the controller 180 can increase the number of sides of a polyhedron according to change of a displayed page. That is, the controller 180 can display a triangular pillar when a displayed page is changed up to twice and display a square pillar, a pentagonal pillar and the like when a displayed page is changed three time or more.

Referring to FIG. 12(*a*), the controller 180 may receive flick input applied to the address bar 10. The controller 180 may rotate the address bar 10 displayed in a polygonal form according to the direction of the received flick input. As shown in FIG. 12(b), the controller 180 may display the page 21 corresponding to the mark 11, which is displayed on the front side of the polyhedral address bar 10, on the execution screen S.

Accordingly, the user can directly move a desired page by selecting a mark displayed in the address bar 10 only through simple flick input and thus the user can conveniently use applications.

The following description is based on display of a mark in the address bar according to description with reference to FIGS. 3, 4 and 5. However, the following description can also be applied to a case according to the embodiments described with reference to FIGS. 6 to 12.

Figure 13:
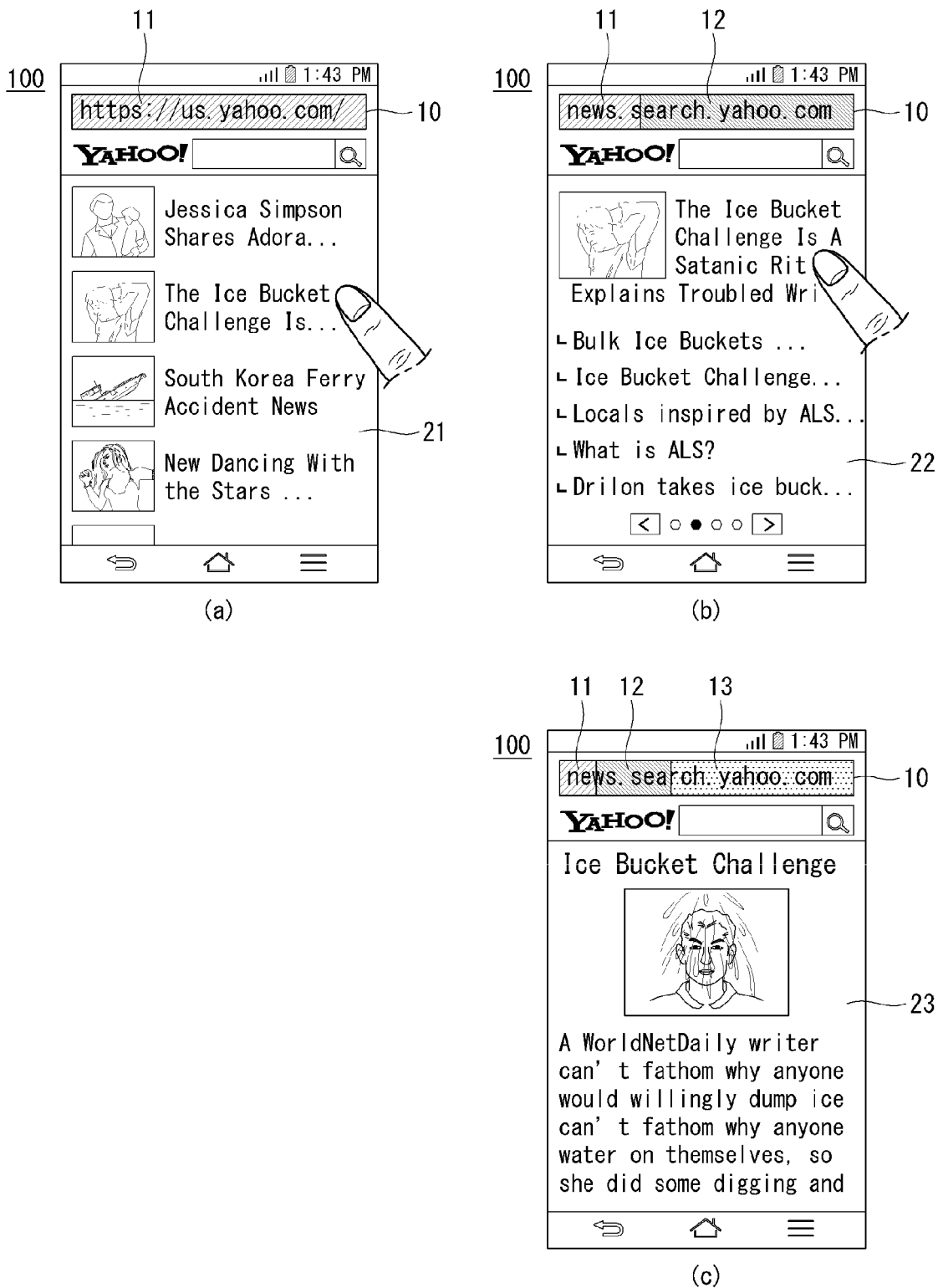
FIG. 13 illustrates operation of displaying a mark corresponding to a page in a size depending on page display time according to an embodiment of the present disclosure.

FIG. 13 illustrates operation of displaying a mark in a size depending on display time of a page corresponding to the mark according to an embodiment of the present disclosure.

As shown in FIG. 13(a), the controller 180 may display the specific page 21 on an execution screen of a specific application. The controller 180 may display the mark 11 corresponding to the displayed page 21 in the address bar 10. The mark 11 is displayed as described above and thus detailed description thereof is omitted.

The controller 180 may receive input for selecting a specific link indicated on the page 21. The controller 180 may display the page 22 corresponding to the selected specific link on the execution screen S, as shown in FIG. 13(b). When the depth value of the previous page 21 is 1, the depth value of the currently displayed page 22 is 2.

Referring to FIG. 13(b), the controller 180 may display the mark 12 corresponding to the changed page 22 in the address bar 10. The controller 180 may display the mark 12 in a size depending on a time for which the page 22 is displayed on the execution screen S.

The controller 180 may measure a time for which the page 21 is displayed on the execution screen S. When the displayed page 21 is changed, the controller 180 may measure the time for which the changed page 22 is displayed. Then, the controller 180 may compare the display time of the previous page 21 with the display time of the changed page 22. The controller 180 may divide the area of the address bar 10 at the ratio of the display time of the previous page to the display time of the currently displayed page and respectively display the marks 11 and 12 corresponding to the pages in divided regions of the address bar 10.

Referring to FIG. 13(b), the second mark 12 is displayed in a larger size than the first mark 11 displayed at the left part of the address bar 10. This means that the page 22 corresponding to the mark 12 is displayed for longer than the page 21 corresponding to the mark 11.

According to one embodiment, the controller 180 may change the size of a mark displayed in the address bar 10. For example, when the display time of the currently displayed page 22 increases, the controller 180 can increase the area occupied by the second mark 12 in the address bar 10 in proportion to the display time increase.

The controller 180 may change the size of the mark displayed in the address bar 10 in a predetermined time unit. For example, when the predetermined time unit is 1 second, the controller 180 can change the mark size ratio in the address bar 10 every second.

However, 1 second is exemplary and the predetermined time unit may be set to a different value as necessary. For example, the controller 180 can change the size of a mark displayed in the address bar 10 in proportion to display time of a page corresponding to the mark.

Referring to FIG. 13(c), marks displayed in the address bar 10 occupy different regions of the address bar 10. In addition, the currently displayed page 23 corresponding to the mark 13 that occupies the largest region is displayed for the longest time.

Accordingly, the user can visually immediately recognize a page that the user views for the longest time. Accordingly, the user can intuitively recognize a page in which the user is more interested through the size of the mark corresponding to the page, displayed in the address bar 10. Furthermore, the user can select a mark that occupies a largest area of the address bar 10 so as to conveniently move to a page corresponding to the selected mark.

Figure 14:
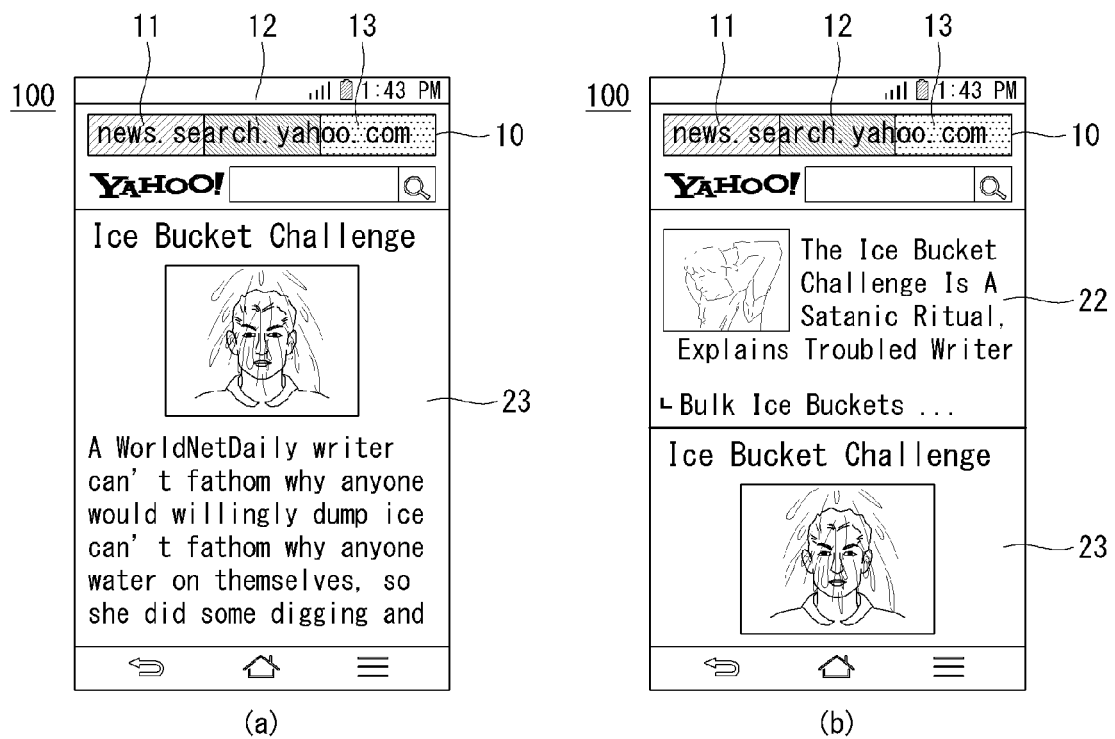
FIG. 14 illustrates operation of simultaneously displaying a currently displayed page and a page corresponding to a mark when the mark is selected according to an embodiment of the present disclosure.

FIG. 14 illustrates operation of simultaneously displaying the currently displayed page and a page corresponding to a mark when the mark is selected according to an embodiment of the present disclosure.

Referring to FIG. 14(a), the page 23 having a depth value of 3 is displayed on the execution screen S. It can be known that the depth value of the page 23 is 3 since the mark 13 corresponding to the displayed page 23 is positioned a third place from the left of the address bar according to the above description.

The controller 180 may receive input for selecting the mark 12 displayed in the middle of the address bar 10 from among the marks 11, 12 and 13 displayed in the address bar 10. In this case, the controller 180 may display the currently displayed page 23 in the lower part of the page display area P. The controller 180 may display the page 22 corresponding to the selected mark 12 in the upper part of the page display area P.

However, this is exemplary and the present invention is not limited thereto. The controller 180 may segment the page display area P in a different way and respectively display the pages 22 and 23 in segmented regions of the page display area P as necessary. For example, the pages 22 and 23 can be displayed in different sizes. Alternatively, the controller 180 may display the page 22 corresponding to the selected mark 12 in a smaller size than the currently displayed page 23 in such a manner that the page 22 is superposed on the page 23.

While FIG. 14(b) shows only two pages, the number of pages is not limited thereto. The number of pages respectively displayed in segmented regions of the page display area P may be changed as necessary.

The controller 180 may receive input for selecting one of the displayed pages 22 and 23. In this case, the controller 180 can display a selected page in the entire page display area P.

Accordingly, the user can conveniently check a previously displayed page while maintaining the current page.

Figure 15:
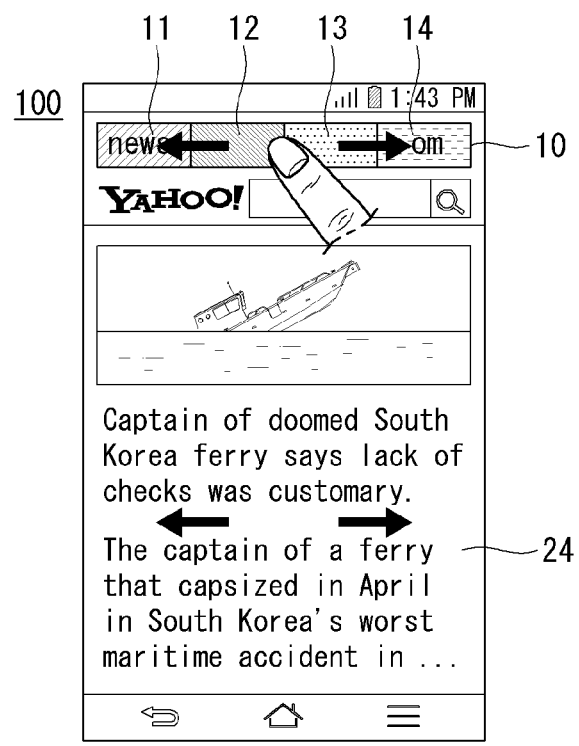
FIG. 15 illustrates operation of changing a displayed page according to drag input applied to an address bar according to an embodiment of the present disclosure.

FIG. 15 illustrates operation of changing a displayed page according to drag input applied to the address bar according to an embodiment of the present disclosure.

A page 24 shown in FIG. 15 has a depth value of 4 according to the above description. The controller 180 may receive drag input applied to the address bar 10. The controller 180 may change the page displayed on the execution screen S according to the drag input.

For example, upon reception of drag input toward the left, the controller 180 can display the page 23 corresponding to the mark 13. When the drag input is continuously applied, the controller 180 can display the page 22 corresponding to the mark 12.

The displayed page is continuously changed until there is no more page corresponding to a mark in the drag input direction (direction to the left). When there is no more page corresponding to a mark in the drag input direction, the controller 180 may display the page 24 corresponding to the rightmost mark 14. Then, page display can be continuously changed.

Accordingly, the user can easily browse pages only using drag input applied to the address bar 10.

FIGS. 16 to 22 illustrate display of a specific page using a thumbnail corresponding to a page according to an embodiment of the present disclosure.

Figure 16:
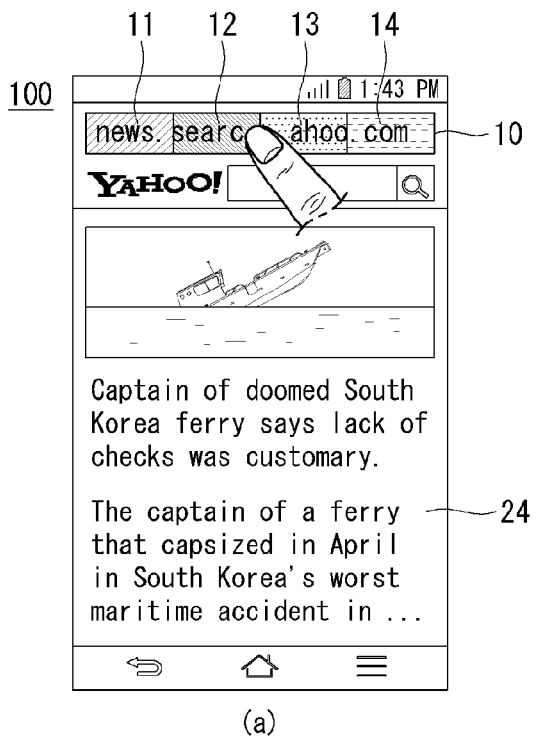
FIGS. 16 to 22 illustrate operation of displaying a specific page using thumbnails corresponding to pages according to an embodiment of the present disclosure.
Figure 16:
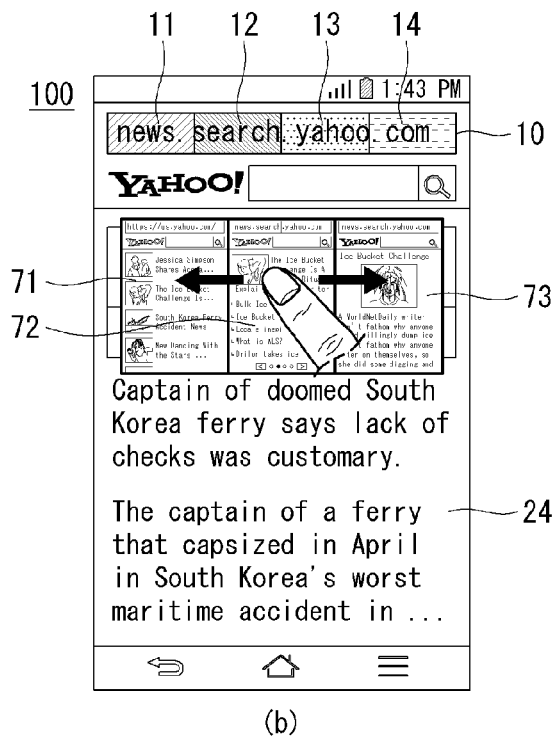

Referring to FIG. 16(*a*), the marks 11 to 14 respectively corresponding to the pages are displayed in the address bar 10. The controller 180 may receive specific input for selecting one mark 12 of the marks 11 to 14. In one embodiment, the specific input may be long touch input applied for longer than a predetermined time.

However, the specific input is not limited thereto and may be set to touches in various manners, such as short touch, long touch, multi-touch, drag touch, flick touch, pinch-in touch, pinch-out touch, swipe touch and hovering touch, or a combination thereof. In this case, the specific input needs to be configured to be discriminated from other inputs including touch input for selecting the address bar.

The controller 180 may display three thumbnails including a thumbnail 72, which corresponds to the selected mark 12, at the center. However, this is exemplary and the number and arrangement of displayed thumbnails may be changed as necessary. For example, the controller 180 can display thumbnails 71 to 73 respectively corresponding to the marks 11 to 13 and a thumbnail corresponding to the mark 14 displayed in the address bar 10.

The controller 180 may change display of the thumbnails according to flick input applied to the displayed thumbnails 71, 72 and 73. For example, upon reception of flick input toward the left, the controller 180 can display the thumbnail corresponding to the mark 14 on the right of the rightmost thumbnail 73. In this case, display of the leftmost thumbnail 71 disappears and two thumbnails 72, 73 and the thumbnail corresponding to the mark 14 can be displayed.

Upon reception of input for selecting one of the displayed thumbnails, the controller 180 may display a page corresponding to the selected thumbnail.

Accordingly, the user can intuitively recognize pages corresponding to marks displayed in the address bar 10 through corresponding thumbnails. Therefore, the user can easily display a desired page.

Figure 17:
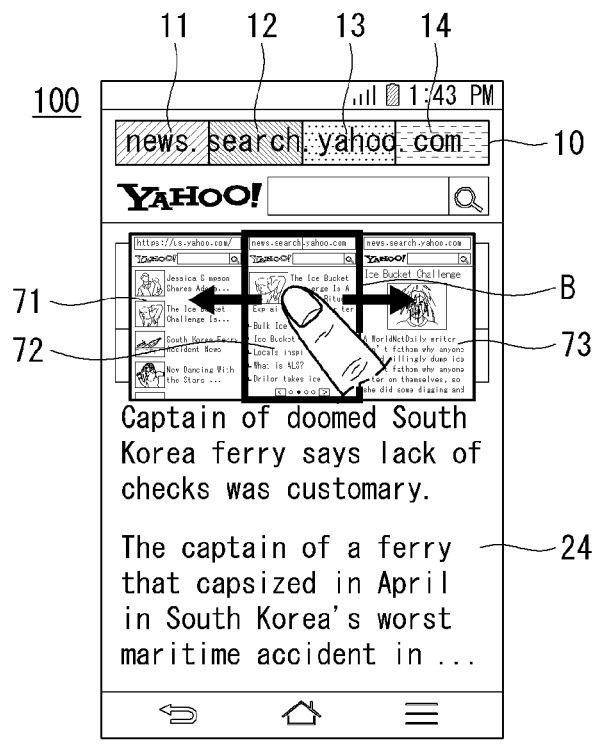

When touch input is applied to a thumbnail, the controller 180 may further display a mark B for displaying the selected thumbnail according to an embodiment, as shown in FIG. 17. The controller 180 may move the mark B according to drag input from the user in one direction.

Accordingly, the user can easily recognize a thumbnail that the user wants to select.

Figure 18:
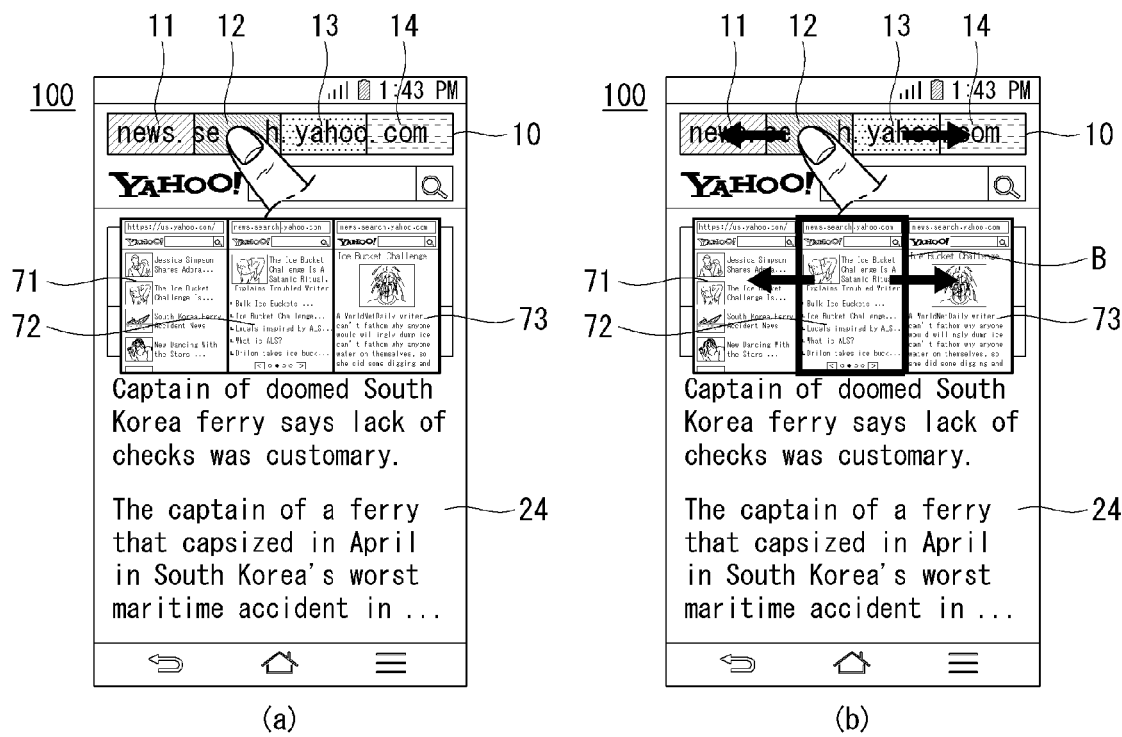

FIG. 18 illustrates operation of changing displayed thumbnails according to an embodiment of the present disclosure.

Referring to FIG. 18(*a*), the controller 180 may receive input for selecting the specific mark 12 displayed in the address bar 10. In this case, the controller 180 may display corresponding thumbnails 71, 72 and 73. This operation is substantially the same as described with reference to FIG. 16 and thus description thereof is omitted.

Referring to FIG. 18(*b*), the user may apply specific input to the address bar 10 and then apply drag input to the left and right while touching the address bar 10. The specific input may be set to touches in various manners, such as short touch, long touch, multi-touch, drag touch, flick touch, pinch-in touch, pinch-out touch, swipe touch and hovering touch, or a combination thereof. In this case, the specific input needs to be configured to be discriminated from other inputs including touch input for selecting the address bar.

The controller 180 may change display of the thumbnails 71, 72 and 73 according to the drag input. For example, the controller 180 can display the thumbnail corresponding to the mark 14 on the right of the rightmost thumbnail upon reception of drag input to the right. In this case, display of the leftmost thumbnail 71 disappears and two thumbnails 72, 73 and the thumbnail corresponding to the mark 14 can be displayed.

The controller 180 may receive input for selecting one of the displayed thumbnails and display a page corresponding to the selected thumbnail.

According to one embodiment, the controller 180 may further display the mark B for displaying the selected thumbnail. The controller 180 may move the mark B according to drag input of the user in one direction.

Accordingly, the user can intuitively recognize pages and rapidly select a specific page.

Figure 19:
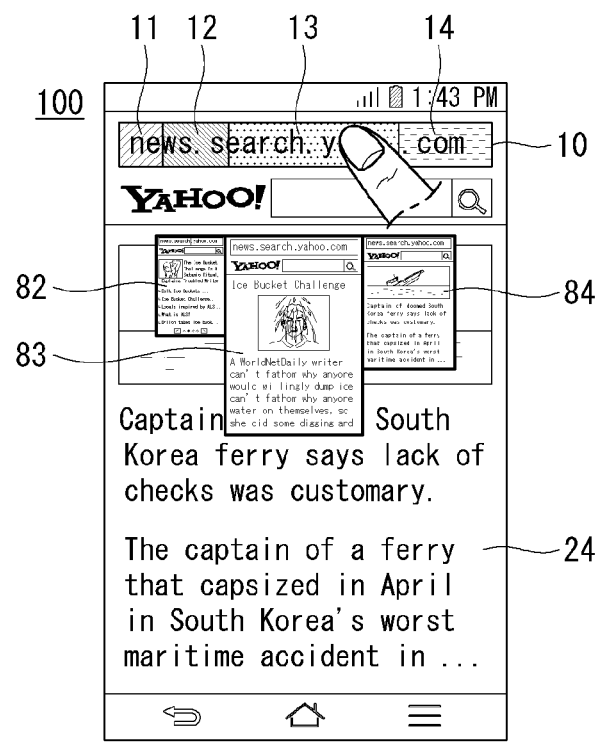

FIG. 19 illustrates operation of displaying a thumbnail in a size depending on a time for which a page corresponding to the thumbnail is displayed on the execution screen S.

As described above with reference to FIG. 13, the controller 180 may display the marks 11 to 14 corresponding to the pages in different sizes in proportion to times for which the pages are displayed. Description of FIG. 16 can be equally applied to display of thumbnails 82, 83 and 84 shown in FIG. 19.

The controller 180 may adjust the sizes of the thumbnails 82, 83 and 84 in proportion to times for which the pages corresponding thereto are displayed. To this end, the controller 180 may measure a time for which each page is displayed on the execution screen S, as described above with reference to FIG. 13.

Subsequently, the controller 180 may compare a display time of the previous page 21 with a display time of the currently displayed page 22. The controller 180 may display thumbnails in different sizes on the basis of a page display time ratio.

In one embodiment, the size of a reference thumbnail may be predetermined on the basis of predetermined time. For example, the size of a thumbnail corresponding to a page displayed for one second can be predetermined as the size of the reference thumbnail. In this case, a thumbnail corresponding to a page displayed for two seconds can be displayed in a size double the size of the reference thumbnail.

Referring to FIG. 19, the second thumbnail 83 is displayed in a larger size than the leftmost thumbnail 82. This means that the page 23 corresponding to the mark 13 is displayed for longer than the page 22 corresponding to the mark 12.

The controller 180 may change the size of a thumbnail and display the thumbnail in the changed size according to an embodiment. For example, when the display time of the currently displayed page 24 increases, the controller 180 can proportionally increase the size of the thumbnail 84 corresponding to the page 24.

The controller 180 may change the thumbnail size in a predetermined time unit. For example, when the predetermined time unit is one second, the controller 180 can change the thumbnail size every second.

However, one second is exemplary and the predetermined time unit can be set to a different value as necessary. For example, the controller 180 can change the thumbnail size in proportion to page display time in real time.

Accordingly, the user can easily recognize a page in which the user is interested by visually checking thumbnail sizes. In addition, the user can immediately check the contents of the page through the thumbnail corresponding thereto.

Figure 20:
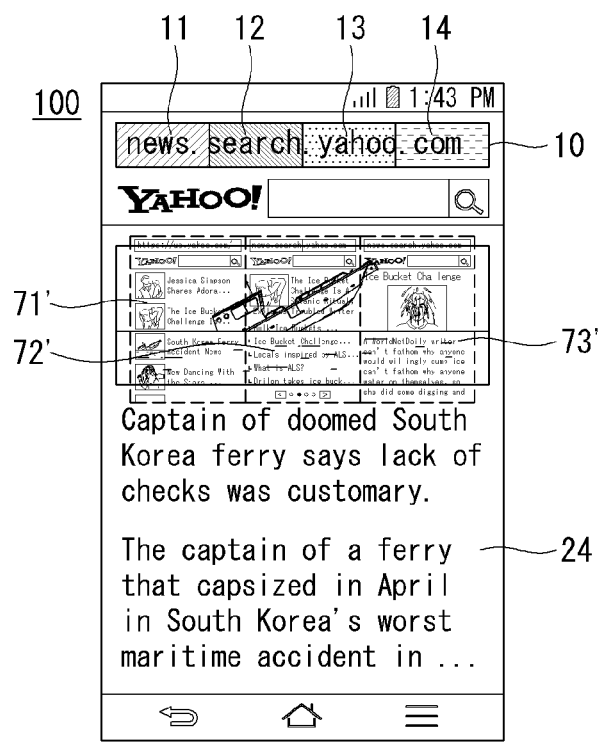

Referring to FIG. 20, thumbnails corresponding to pages may be translucently displayed. Thumbnails 71', 72' and 73' are indicated by dotted lines in FIG. 20, which represents translucent display of the thumbnails 71', 72' and 73'. Translucent display of thumbnails can be equally applied to display of thumbnails according to embodiments described in the specification.

Accordingly, the user can conveniently check the contents of a page located under displayed thumbnails.

Figure 21:
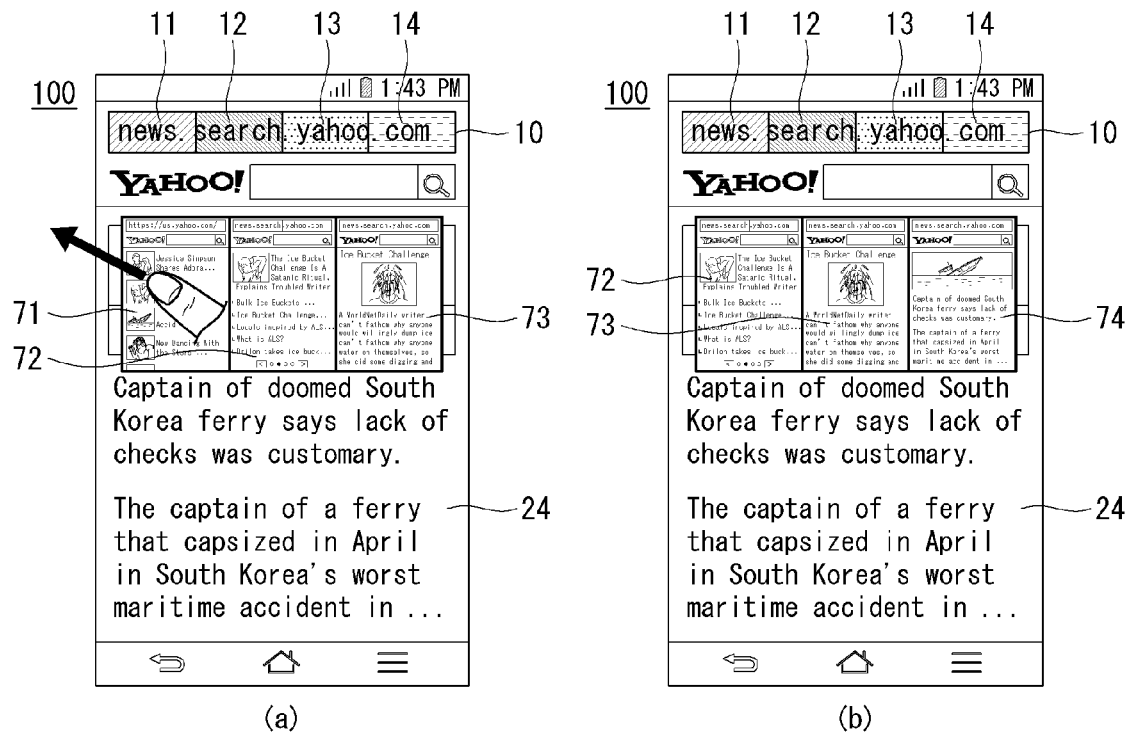

FIG. 21 illustrates elimination of a displayed thumbnail according to an embodiment of the present invention.

The thumbnails 71, 72 and 73 displayed on the execution screen S may be eliminated when a predetermined input is applied to the execution screen S. Referring to FIG. 21(*a*), the controller 180 may receive specific input applied to one 71 of the displayed thumbnails 71, 72 and 73.

In FIG. 21(*a*), input of touching and dragging the thumbnail 71 is shown as the specific input. The direction of the drag is not limited to a specific direction.

However, the specific input is not limited to the aforementioned touch-and-drag input and may be set to various touches, such as short touch, long touch, multi-touch, drag touch, flick touch, pinch-in touch, pinch-out touch, swipe touch and hovering touch, or a combination thereof.

In this case, the controller 180 can cancel display of the thumbnail 71. Accordingly, the controller 180 can display the thumbnail 74, which was not displayed, as shown in FIG. 21(*b*).

The controller 180 may determine a thumbnail to be newly displayed in the direction of drag input applied after the thumbnail to be removed is touched. The direction of the drag input may be a leftward direction on the basis of the touch point, as shown in FIG. 21(*a*). In this case, the controller 180 can move the thumbnails 72 and 73, located on the right of the thumbnail 71 to be removed, to the left. Then, the thumbnail 74 can be displayed.

Conversely, the direction of the drag input may be a rightward direction on the basis of the touch point. In this case, the controller 180 can move thumbnails, which are located to the left of a thumbnail to be removed, to the right. Then, a thumbnail, which was not displayed, can be displayed. When the leftmost thumbnail 71 is removed, as shown in FIG. 21, the controller 180 can cancel display of the thumbnail 71.

The direction of the drag input may be an upward or downward direction on the basis of the touch point according to another embodiment. In this case, the controller 180 can cancel only display of a removed thumbnail.

In addition, the controller 180 may simultaneously remove a plurality of thumbnails. For example, the user may select a plurality of thumbnails to be removed through multi-touch input. However, the present invention is not limited thereto. The plurality of thumbnails may be selected through a predetermined combination of touch inputs.

When the aforementioned drag input is applied to the selected thumbnails, the controller 180 can simultaneously remove the thumbnails.

Accordingly, the user can conveniently remove a displayed thumbnail through simple touch operation.

A thumbnail displayed on the execution screen S may be removed after lapse of a predetermined time according to another embodiment. Thumbnail display time may be set to 10 seconds. In this case, the controller 180 can remove a displayed thumbnail after lapse of 10 seconds from when the thumbnail is displayed according to the aforementioned embodiments.

Furthermore, when the number of displayed thumbnails exceeds a predetermined number, the controller 180 may remove the first displayed thumbnail according to another embodiment. However, the present invention is not limited thereto. The controller 180 may remove a thumbnail corresponding to the lowest-profile page first according to another embodiment.

Above description of removal of a thumbnail can be applied to display of a thumbnail according to embodiments of the present invention.

Figure 22:
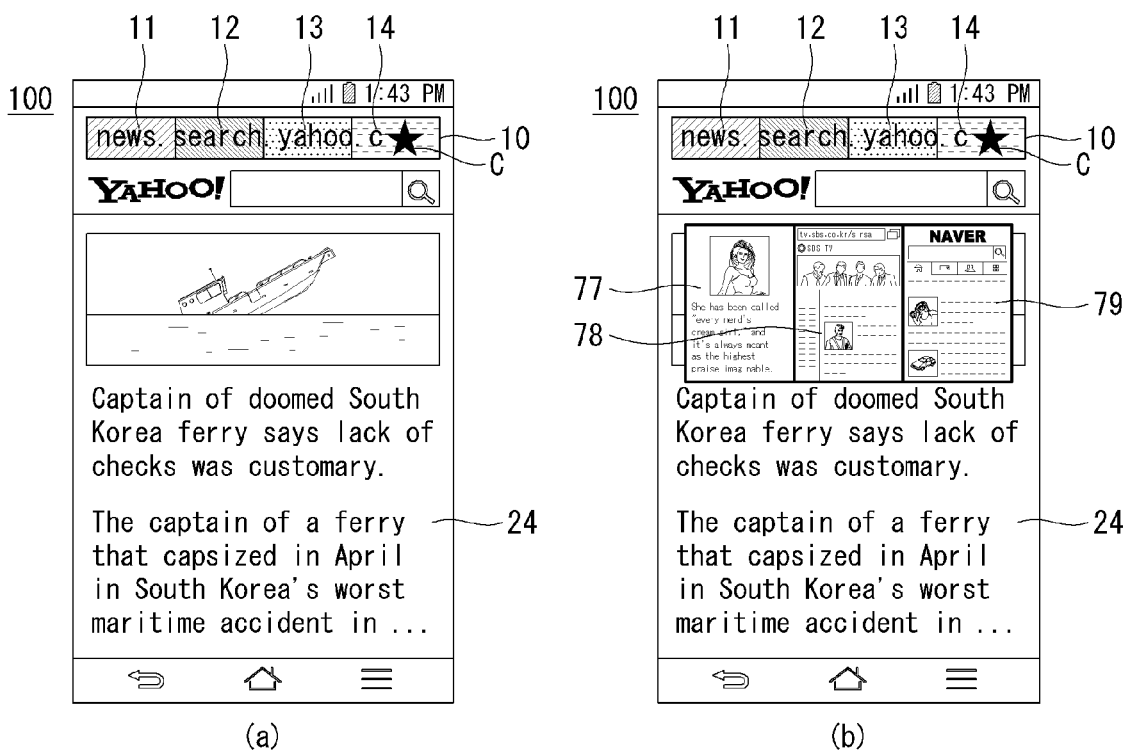

FIG. 22 illustrates application for a high-profile page according to an embodiment of the present invention.

Referring to FIG. 22(*a*), the page 24 having a depth value of 4 is displayed on the execution screen S. The controller 180 can check whether the page 24 is displayed for longer than a predetermined time. When the page 24 is displayed for longer than the predetermined time, the controller 180 can indicate a mark C for representing a high-profile page on the mark 14 corresponding to the page 24, which is displayed in the address bar 10.

While the mark C is represented as a star in FIG. 22(*a*), the mark C can be any mark that is discriminated from other marks and can be emphasized. For example, the mark C can be indicated in such a manner that the mark 14 is flickering or the border of the mark 14 is emphasized.

According to another embodiment, the user may apply specific input for selecting a mark corresponding to a page on which the user wants to indicate the mark C. The specific input may be set to various touches, such as short touch, long touch, multi-touch, drag touch, flick touch, pinch-in touch, pinch-out touch, swipe touch and hovering touch, or a combination thereof. In this case, the controller 180 can indicate the mark C on the selected mark.

Accordingly, the user can visually easily recognize a high-profile page.

Referring to FIG. 22(*b*), the controller 180 may extract a keyword for the high-profile page. Keyword extraction may be performed on the basis of the frequency of appearance of a specific word in text included in the page.

However, the present invention is not limited thereto and the controller 180 may extract a keyword for images along with the text included in the page. Known techniques can be applied to keyword extraction and thus detailed description of keyword extraction is omitted.

The controller 180 may search and display pages including the extracted keyword. The controller 180 can search the pages through the wireless communication unit 110 using an external communication network.

Referring to FIG. 22(*b*), the controller 180 may display the searched pages as thumbnails 77, 78 and 79. The thumbnails 77, 78 and 78 may be displayed in order of the number of keywords included therein according to an embodiment. Alternatively, the thumbnails 77, 78 and 79 may be displayed in different sizes in proportion to the number of keywords included therein. Above description of display and removal of a thumbnail can be substantially equally applied to the present embodiment.

Accordingly, the user can use the corresponding application more effectively since the user can be provided with pages related to a high-profile page.

Figure 23:
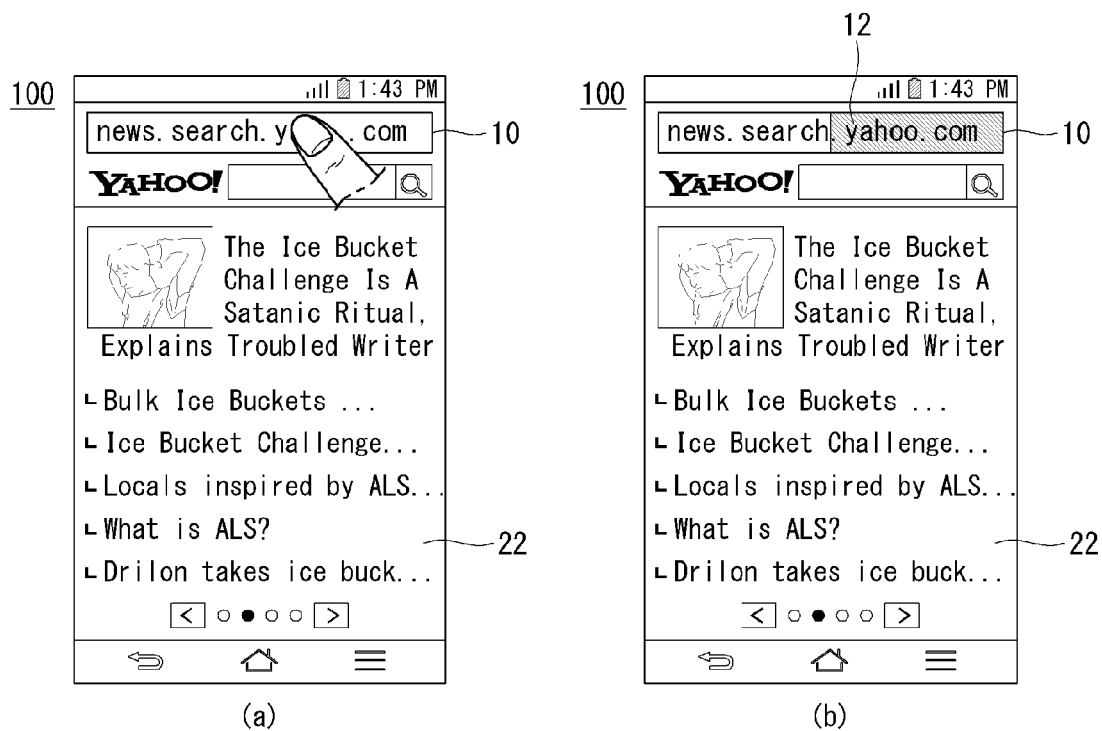
FIGS. 23, 24 and 25 illustrate operation of displaying a mark corresponding to a specific page through specific input according to an embodiment of the present disclosure.
Figure 24:
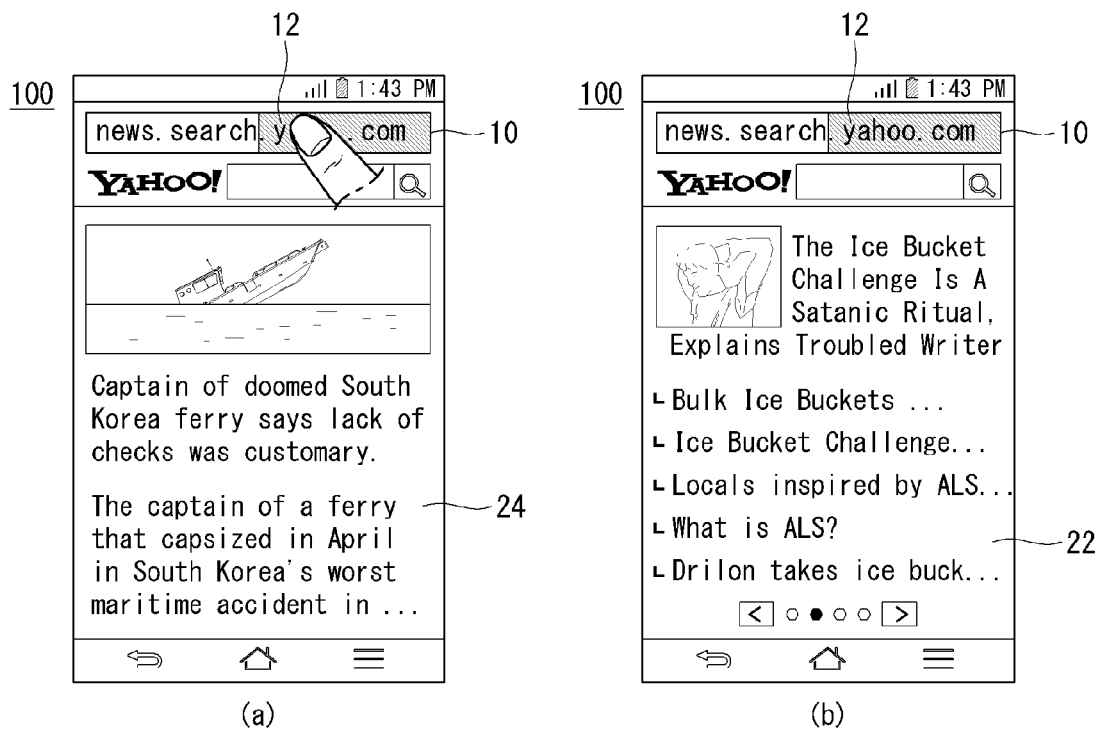
Figure 25:
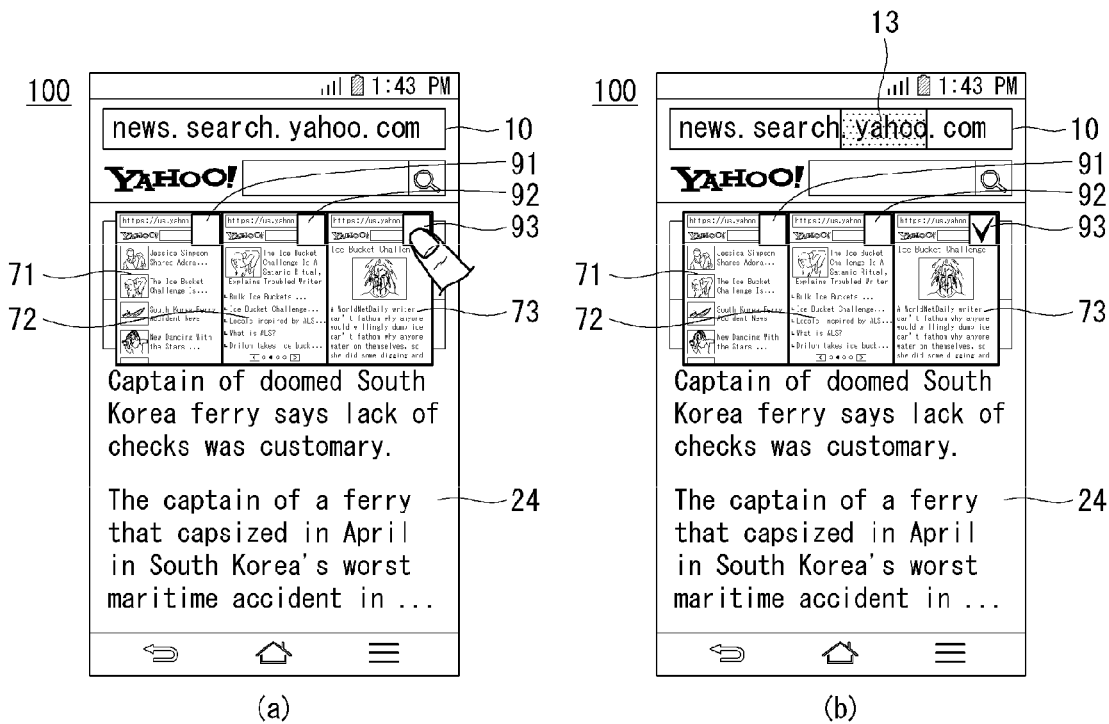

FIGS. 23, 24 and 25 illustrate operation of displaying a mark corresponding to a specific page using specific input according to an embodiment of the present invention.

The controller 180 may receive predetermined input applied to a region of the execution screen S. Referring to FIG. 23(a), the region of the execution screen S may be the address bar. The predetermined input may be set to touches in various manners or a combination thereof. In this case, the specific input needs to be configured to be discriminated from other inputs including touch input for selecting the address bar.

Upon reception of the predetermined input, the controller 180 can display the mark 12 corresponding to the currently displayed page 22 on the region of the execution screen S. Referring to FIG. 23(b), the region of the execution screen S may be the address bar 10.

The controller 180 may store depth values of pages displayed upon execution of the application in the memory 170. It is assumed that the depth value of the currently displayed page 22 is 2 in FIG. 22(a). In this case, the controller 180 may divide the area of the address bar 10 into two regions and display the mark 12 in the second region, as shown in FIG. 23(b).

However, the present invention is not limited thereto. The controller 180 may set the depth value of the page, which is displayed when the predetermined input, is received to 1. In this case, the mark 12 can be displayed in the entire address bar 10 until the displayed page is changed.

Referring to FIG. 24(a), the page 24 is changed at least once after the mark 12 is displayed. In this case, the mark 12 displayed in the address bar 10 can be maintained as shown in FIG. 24(a). Alternatively, the address bar 10 may be divided according to the depth value of the displayed page 24. In this case, the mark 12 can be displayed in a region corresponding to the depth value of 2.

The controller 180 may receive specific input applied to the mark 12. The specific input may be set to touches in various manners or a combination thereof. Upon reception of the specific input, the controller 180 can display the page corresponding to the mark 12, as shown in FIG. 24(b).

In this manner, the user can display a mark corresponding to a page that the user wants to remember using simple touch operation. Accordingly, the user can conveniently access the page that the user wants to remember.

Referring to FIG. 25(a), when the page displayed on the execution screen S is changed, the controller 180 may display the thumbnails 71, 72 and 73 corresponding to previous pages. The thumbnails 71, 72 and 73 can be displayed upon reception of specific input. Since above description of thumbnail display can be equally applied, detailed description thereof is omitted.

The controller 180 may display indicators 91, 92 and 93 for setting marks corresponding to pages on the execution screen. S. As shown in FIG. 25(a), the user can select the indicator 93 indicated on a thumbnail corresponding to a page that the user wants to remember.

The controller 180 may indicate selection of the indicator 93, as shown in FIG. 25(b). The controller 180 may display the mark 13 corresponding to the indicator 93 in the address bar 10 according to an embodiment.

The displayed thumbnails 71, 72 and 73 can be removed as described above with reference to FIG. 21. When the user selects the mark 13, the controller 180 can display the page corresponding to the mark 13.

Accordingly, the user can check previously displayed pages through thumbnails corresponding thereto and display a mark corresponding to a page that the user wants to remember. In addition, the user can conveniently access the page simply by selecting the mark.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a touchscreen;
   and a controller configured to cause the touchscreen to:
   display an execution screen of a web browser, the execution screen including a page display area and an address bar that concurrently displays one or more Uniform Resource Locator (URL) addresses for each page that is displayed on the execution screen;
   display a first page in the page display area and a first mark corresponding to the first page in the address bar such that the first mark fills the address bar, a first URL address corresponding to the first page superimposed over the first mark, and the address bar comprising an address bar area that encompasses the first URL;
   display a second page in the page display area in response to an input for displaying the second page, wherein the address bar is divided by dividing the address bar area into two regions when the second page is displayed such that the first mark fills a first region of the address bar and a second mark corresponding to the second page fills a second region of the address bar, and wherein the first URL address is superimposed over the first mark in the first region, and a second URL address corresponding to the second page is superimposed over the second mark in the second region;
   and redisplay the first page in response to selection of the first mark, the first mark selected while the execution screen includes the second page, first mark, and the second mark, such that the execution screen includes the first page, the first mark, and the second mark when the first page is redisplayed,
   wherein the address bar is divided into a number of regions corresponding to a number of pages displayed such that each mark corresponding to one of the pages is displayed to fill a corresponding one of the regions.

2. The mobile terminal of claim 1, wherein the controller is further configured to cause the touchscreen to:
display a third page in the page display area in response to an input for displaying the third page that is received while the second page is displayed or while the first page is redisplayed;
and display a third mark corresponding to the third page in addition to the first and second marks in the address bar such that the first mark is included in a resized first region of the address bar, the second mark is included in a resized second region of the address bar, and the third mark fills a newly formed third region of the address bar.

3. The mobile terminal of claim 2, wherein the third mark is not displayed prior to receiving the input for displaying the third page such that the address bar includes only the first region displaying the first mark and the second region displaying the second mark while the second page is displayed or while the first page is redisplayed prior to receiving the input for displaying the third page.

4. The mobile terminal of claim 2, wherein the first URL address is superimposed over the first mark in the first region, the second URL address is superimposed over the second mark in the second region, and a third URL address corresponding to the third page is superimposed over the third mark in the third region.

5. The mobile terminal of claim 1, wherein the address bar is extended in one direction such that the extended address bar is divided into a first area and a second area;
the first area displays the address corresponding to the displayed page; and
the second area displays the first and second marks such that the first mark is included in the first region of the second area and the second mark is included in the second region of the second area.

6. The mobile terminal of claim 1, wherein the input comprises selection of a link included in the first page, the second page corresponding to the selected link.

7. The mobile terminal of claim 1, wherein the first and second marks are displayed in at least different colors or different shapes.

8. The mobile terminal of claim 1, wherein:
a first size of the first mark is based on a first time period for which the first page is displayed on the execution screen;
a second size of the second mark is based on a second time period for which the second page is displayed on the execution screen; and
the first size is greater than the second size when the first time period is greater than the second time period.

9. The mobile terminal of claim 1, wherein the controller is further configured to cause the touchscreen to divide the execution screen into a first area and a second area in response to the selection of the first mark such that the second page is displayed in the first area and the first page is redisplayed in the second area at a same time.

10. The mobile terminal of claim 1, wherein the controller is further configured to cause the touchscreen to:
display a plurality of marks including the first and second marks, the plurality of marks respectively corresponding to a plurality of pages that are displayed on the execution screen, the plurality of pages including the first and second pages;
display a plurality of thumbnail images respectively corresponding to the plurality of marks in response to selection of one of the plurality of marks; and
display one of the plurality of pages corresponding to one of the plurality of thumbnail images in response to selection of the one of the plurality of thumbnail images,
wherein the plurality of marks are continuously displayed in the address bar while the plurality of thumbnail images are displayed.

11. The mobile terminal of claim 10, wherein each of the plurality of thumbnail images is displayed in a size corresponding to a time period for which a corresponding page is displayed on the execution screen such that all of the plurality of thumbnail images are displayed in different sizes when time periods for which respectively corresponding pages are displayed on the execution screen are different.

12. The mobile terminal of claim 10, wherein the plurality of thumbnail images are displayed in a translucent manner such that all contents of a page that is displayed while the plurality of thumbnail images are displayed are visible.

13. The mobile terminal of claim 10, wherein the controller is further configured to cause the touchscreen to no longer display at least one of the plurality of thumbnail images when:
a pre-defined type of input is applied with respect to the at least one of the plurality of thumbnail images;
the at least one of the plurality of thumbnail images is displayed for longer than a threshold time period; or
a number of plurality of thumbnail images displayed on the execution screen is greater than a threshold number.

14. The mobile terminal of claim 1, wherein the controller is further configured to cause the touchscreen to display an indicator with respect to the first mark when the first page is displayed on the execution screen for more than a threshold time period, the indicator indicating the first page as a page of interest or high importance.

15. The mobile terminal of claim 14, wherein the controller is further configured to:
extract a keyword from the first page indicated as the page of interest;
search pages including the keyword; and
cause the touchscreen to display searched pages.

16. The mobile terminal of claim 1, wherein the controller is further configured to cause the touchscreen to display the first mark on the execution screen in response to a pre-defined type of input applied to a specific region of the execution screen while the first page is displayed on the execution screen.

17. The mobile terminal of claim 1, wherein the controller is further configured to cause the touchscreen to:
display a new page on the execution screen;
display a plurality of thumbnail images corresponding to previously displayed pages including the first and second pages while the new page is displayed, each of the plurality of thumbnail images including an area or an indicator for selection of the thumbnail image;
display a mark corresponding to one of the previously displayed pages in the address bar when one of the plurality of thumbnail images is selected via the area or indicator, the one of the plurality of thumbnail images corresponding to the one of the previously displayed pages; and
redisplay the one of the previously displayed pages when the mark is selected, the mark selected while the new page is displayed on the execution screen.

18. A method for controlling a mobile terminal, comprising: displaying an execution screen of a web browser, the execution screen including a page display area and an address bar that concurrently displays one or Uniform Resource Locator (URL) addresses for each page that is displayed on the execution screen;
- displaying a first page in the page display area and a first mark corresponding to the first page in the address bar such that the first mark fills the address bar, a first URL address corresponding to the first page superimposed over the first mark, and the address bar comprising an address bar area that encompasses the first URL;
- displaying a second page in the page display area in response to an input for displaying the second page, wherein the address bar is divided by dividing the address bar area into two regions when the second page is displayed such that the first mark fills a first region of the address bar and a second mark corresponding to the second page fills a second region of the address bar, and wherein the first URL address is superimposed over the first mark in the first region, and a second URL address corresponding to the second page is superimposed over the second mark in the second region;
- and redisplaying the first page in response to selection of the first mark, the first mark selected while the execution screen includes the second pane, first mark, and the second mark, such that the execution screen includes the first page, the first mark, and the second mark when the first page is redisplayed,
- wherein the address bar is divided into a number of regions corresponding to a number of pages displayed such that each mark corresponding to one of the pages is displayed to fill a corresponding one of the regions.

* * * * *